United States Patent
Tsuguma et al.

(10) Patent No.: US 11,852,473 B2
(45) Date of Patent: Dec. 26, 2023

(54) VEHICLE OPERATION PEDAL DEVICE

(71) Applicants: TOYODA IRON WORKS CO., LTD., Aichi (JP); AISIN CORPORTAION, Aichi (JP)

(72) Inventors: Tomohiro Tsuguma, Aichi (JP); Jyunya Abe, Aichi (JP); Masashi Momiyama, Aichi (JP); Kota Saito, Aichi (JP); Naoya Yoshizawa, Aichi (JP)

(73) Assignees: TOYODA IRON WORKS CO., LTD., Aichi (JP); AISIN CORPORATION, Aichi (JP)

( * ) Notice: Subject to any disclaimer, the term of this patent is extended or adjusted under 35 U.S.C. 154(b) by 0 days.

(21) Appl. No.: 17/755,232

(22) PCT Filed: Oct. 23, 2020

(86) PCT No.: PCT/JP2020/039858
§ 371 (c)(1),
(2) Date: Apr. 25, 2022

(87) PCT Pub. No.: WO2021/085322
PCT Pub. Date: May 6, 2021

(65) Prior Publication Data
US 2022/0373319 A1  Nov. 24, 2022

(30) Foreign Application Priority Data
Oct. 31, 2019 (JP) .................. 2019-198084

(51) Int. Cl.
*G01B 7/30* (2006.01)
*G05G 1/44* (2008.04)

(52) U.S. Cl.
CPC .................. *G01B 7/30* (2013.01); *G05G 1/44* (2013.01)

(58) Field of Classification Search
None
See application file for complete search history.

(56) References Cited

U.S. PATENT DOCUMENTS 7,404,342 B2 *  7/2008  Wurn .................. G05G 1/38
                                              74/512
2002/0175676 A1  11/2002  Pfaffenberger et al.
(Continued)

FOREIGN PATENT DOCUMENTS

DE  102007032500 A1  1/2009
DE  202010006570 U1  9/2010
(Continued)

OTHER PUBLICATIONS

International Search Report dated Dec. 8, 2020 issued in PCT/JP2020/039858.
(Continued)

*Primary Examiner* — Vicky A Johnson
(74) *Attorney, Agent, or Firm* — Pearne & Gordon LLP

(57) ABSTRACT

To provide a vehicle operating pedal apparatus with a compact space for mounting an angle sensor that detects the angle of rotation of an operating pedal. A vehicle operating pedal apparatus (10) includes: a left support member (20) and a right support member (22) that face each other; an operating pedal (12) that is provided at the upper end with a boss (18), and supported between the left support member (20) and the right support member (22) in such a manner as to be pivotable via a pivot bolt (26) and a collar (29) that are inserted into the boss (18); and an angle sensor (50) configured to detect the angle of rotation of the operating pedal (12). The angle sensor (50) includes: an IC (56) provided on an inner side between the left support member (20) and the right support member (22); and a magnet (58) provided at
(Continued)

the upper end of the operating pedal (12), facing the IC (56), to be detected by the IC (56).

9 Claims, 42 Drawing Sheets

(56) References Cited

U.S. PATENT DOCUMENTS

| | | |
|---|---|---|
| 2003/0112003 A1 | 6/2003 | Pfaffenberger et al. |
| 2012/0056739 A1 | 3/2012 | Lee et al. |
| 2015/0007684 A1 | 1/2015 | Saito et al. |
| 2016/0102997 A1 | 4/2016 | Wurn et al. |
| 2017/0210227 A1 | 7/2017 | Chapman et al. |
| 2020/0192415 A1 | 6/2020 | Nagashima et al. |

FOREIGN PATENT DOCUMENTS

| | | | | |
|---|---|---|---|---|
| EP | 2141785 A2 * | 1/2010 | ........... | H02K 11/215 |
| JP | H07-127610 A | 5/1995 | | |
| JP | 2005-500197 A | 1/2005 | | |
| JP | 2008-183974 A | 8/2008 | | |
| JP | 2010-140294 A | 6/2010 | | |
| JP | 2012-056564 A | 3/2012 | | |
| JP | 2012056564 A * | 3/2012 | ............. | B60Q 1/441 |
| JP | 2014-021791 A | 2/2014 | | |
| JP | 2015-009760 A | 1/2015 | | |
| JP | 2017-537306 A | 12/2017 | | |
| KR | 1508874 B1 * | 4/2015 | ............. | B60K 23/02 |
| WO | 2018/123436 A1 | 7/2018 | | |

OTHER PUBLICATIONS

Japanese Office Action dated Jun. 6, 2023 for the corresponding Japanese Patent Application No. 2021-553553.

Search Report dated Oct. 27, 2023 for the corresponding European Patent Application No. 20881513.4.

* cited by examiner

FIG. 5
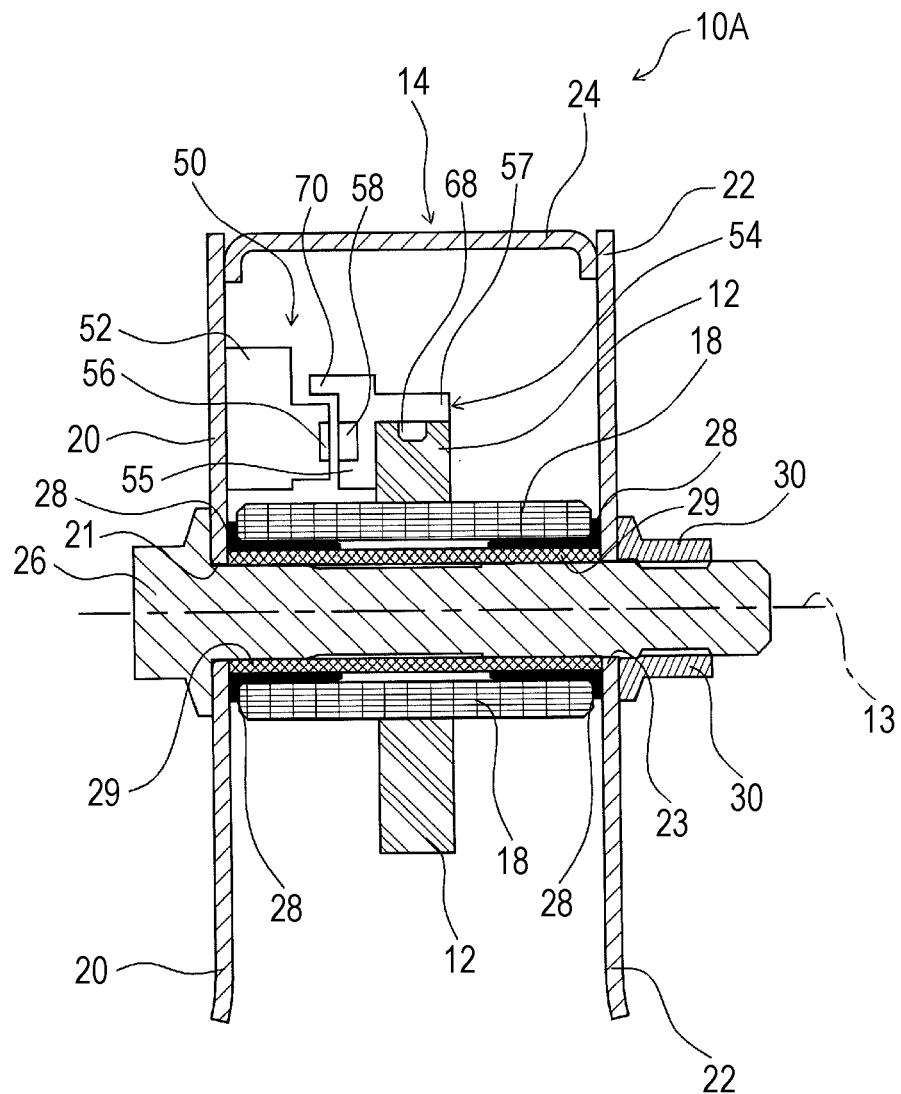
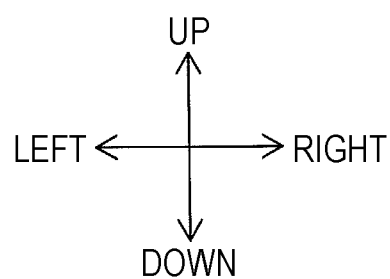

FIG. 33
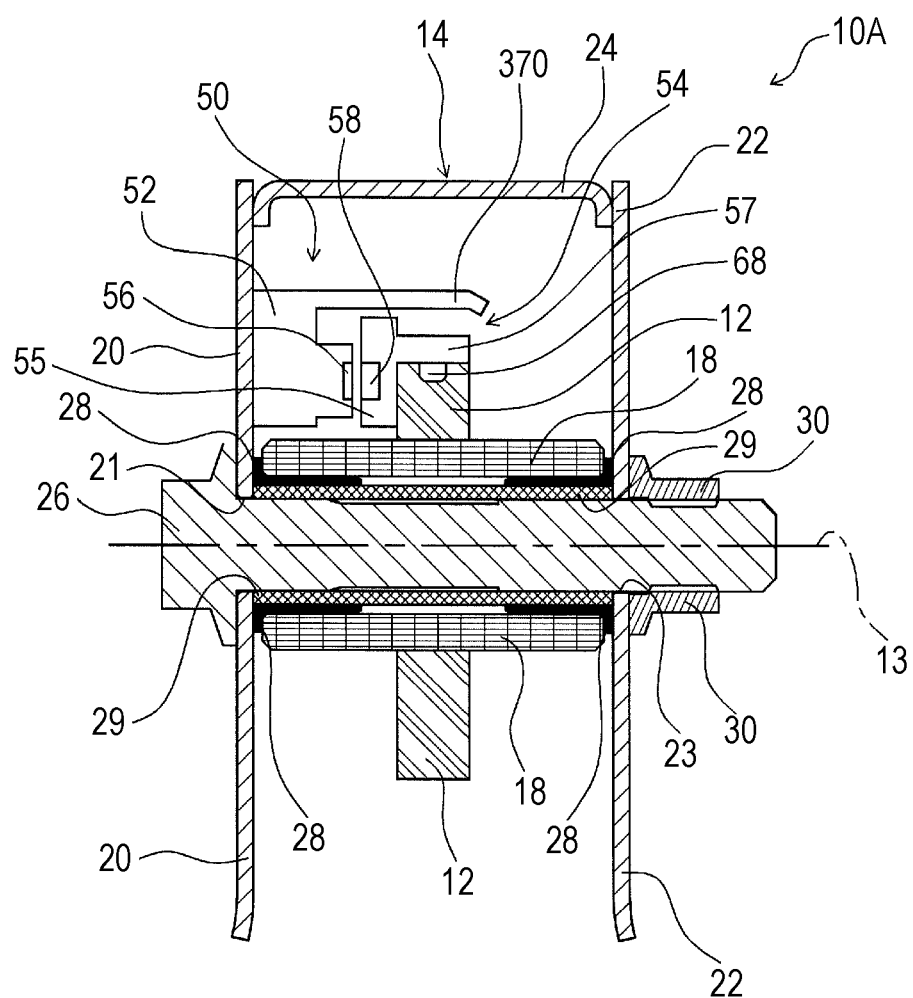
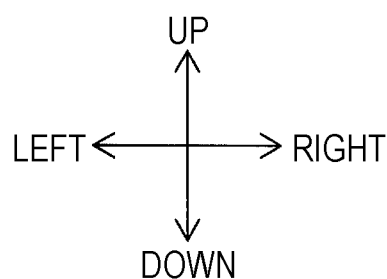

VEHICLE OPERATION PEDAL DEVICE

TECHNICAL FIELD

The present invention relates to a vehicle operating pedal apparatus including an angle sensor that detects the angle of rotation of an operating pedal.

BACKGROUND ART

Various technologies related to the above vehicle operating pedal apparatus have conventionally been proposed.

For example, a technology described in Patent Literature 1 below is an operation amount detection apparatus, and includes a stroke sensor that detects the stroke of the tread of a pedal section (a pedal stroke). The stroke sensor includes a sensor body, and a sensor arm (a part of the sensor body) provided in such a manner as to be pivotable on a sensor pivot axis relative to the sensor body. The sensor arm has a pair of bifurcations that are two branches divided and extend substantially parallel. A guide groove that extends radially outward from the sensor pivot axis and is formed in a straight line is provided between the pair of bifurcations. A pin fixed to the pedal arm is slidably engaged in the guide groove. The pedal arm has a substantially arc shape, is fixed to the upper end of the pedal section, and pivots integrally with the pedal section. The pin is fixed to the upper end of the pedal arm, and protrudes in a direction substantially orthogonal to the pedal arm extension direction (toward the stroke sensor).

CITATION LIST

Patent Literature

PATENT LITERATURE 1: JP-A-2014-21791

SUMMARY OF INVENTION

Problems to be Solved by Invention

The operation amount detection apparatus described in Patent Literature 1 above is provided to the pedal section for a vehicle and therefore a compact apparatus is desired.

Hence, the present invention has been made, considering the above point, and an objective thereof is to provide a vehicle operating pedal apparatus having a compact space for mounting an angle sensor that detects the angle of rotation of an operating pedal.

Solutions to Problems

In order to achieve the above described objective, the invention according to claim 1 is a vehicle operating pedal apparatus which includes: a pair of support members fixed to a vehicle member, the pair of support members facing each other, an operating pedal provided at one end with a tubular boss for the pedal, the operating pedal being supported between the pair of support members in such a manner as to be pivotable on a pivot axis member that is inserted into holes provided in the support members and the boss; and an angle sensor configured to detect the angle of rotation of the operating pedal. The angle sensor includes: a Hall device provided on an inner side between the pair of support members; and a magnet provided at the one end of the operating pedal, facing the Hall device, the magnet being configured to detect the magnetic field of the Hall device.

The invention according to claim 2 is the vehicle operating pedal apparatus according to claim 1, in which the Hall device and the magnet face each other in a position that is closer to the pivot axis member than a side surface at the one end of the operating pedal.

The invention according to claim 3 is the vehicle operating pedal apparatus according to claim 1, in which the magnet is placed, in an arc shape that is equidistant from a pivot center line of the operating pedal, on a side surface at the one end of the operating pedal.

The invention according to claim 4 is the vehicle operating pedal apparatus according to any one of claims 1 to 3, including: a device holder to which the Hall device is fixed, the device holder being attached to the support member; a magnet holder to which the magnet is fixed, the magnet holder being attached to the one end of the operating pedal; and a cover jutting out from the device holder or the magnet bolder, the cover being disposed in at least part of a gap across which the Hall device and the magnet face each other, and of an outer space.

The invention according to claim 5 is the vehicle operating pedal apparatus according to claim 4, in which the cover is provided to the device holder.

The invention according to claim 6 is the vehicle operating pedal apparatus according to claim 4, in which the cover is provided to the magnet holder.

The invention according to claim 7 is the vehicle operating pedal apparatus according to any one of claims 4 to 6, in which the cover is provided to at least one of the upper side of the gap, the front side of a vehicle, or the back side of the vehicle.

The invention according to claim 8 is the vehicle operating pedal apparatus according to any one of claims 4 to 7, in which the cover has a surface facing the outer space, the surface inclining downward from a distal end toward a proximal end thereof.

The invention according to claim 9 is the vehicle operating pedal apparatus according to claim 1 or 2, further including: a device holder including a protrusion to which the Hall device is fixed, the device holder being attached to the support member from the outside of the support member, wherein the protrusion of the device holder is inserted from the outer side to the inner side of the support member through an insertion hole of the support member to provide the Hall device on the inner side between the pair of support members.

Effects of Invention

A vehicle operating pedal apparatus of the present invention has a compact space for mounting an angle sensor that detects the angle of rotation of an operating pedal.

BRIEF DESCRIPTION OF DRAWINGS

FIG. 5 is a diagram illustrating the vehicle operating pedal apparatus in a cross-section taken along line I-I in FIG. 3.

FIG. 33 is a diagram illustrating a third modification of the vehicle operating pedal apparatus in a cross-section taken along line I-I in FIG. 3.

DESCRIPTION OF EMBODIMENTS

Figure 1:
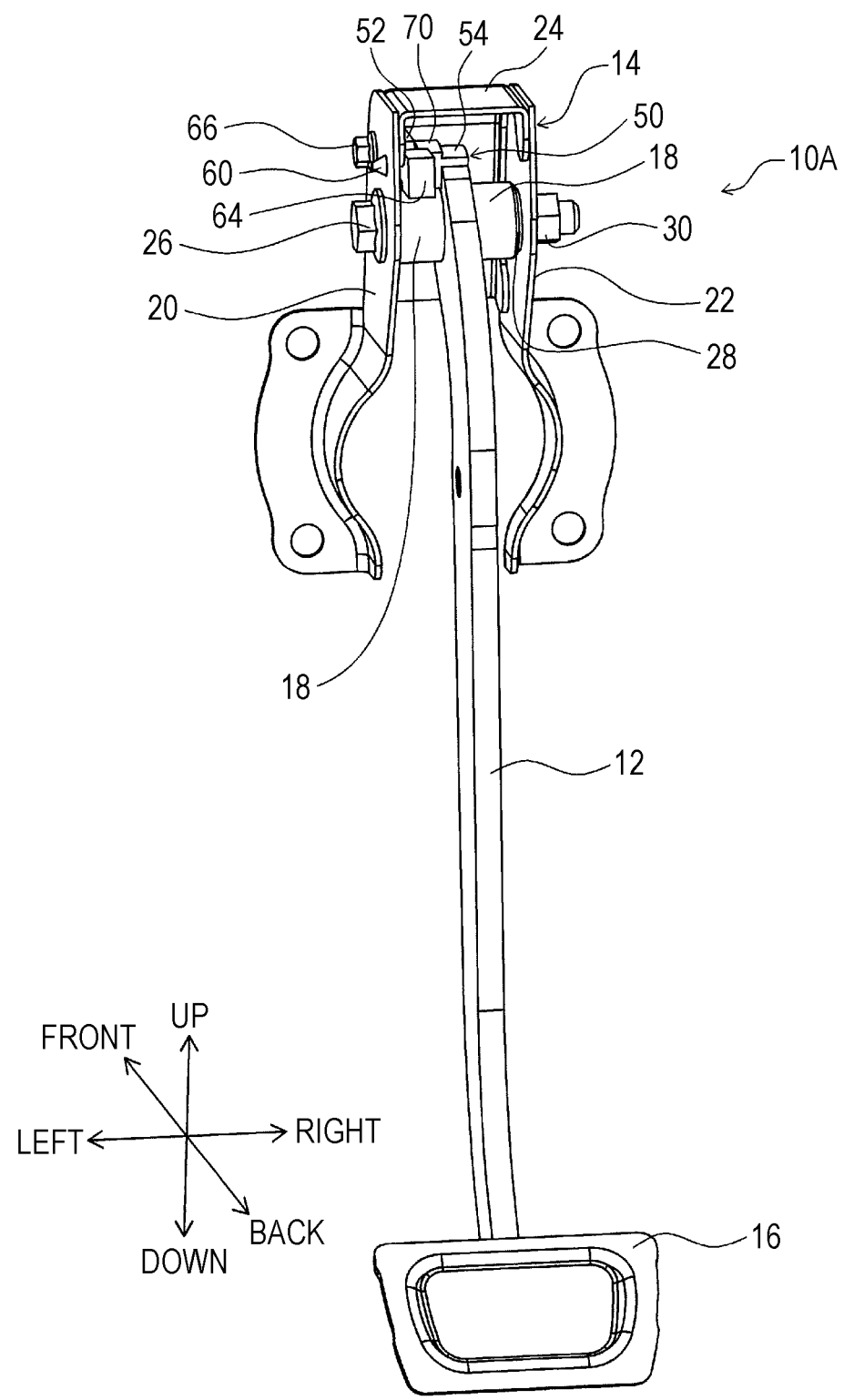
FIG. 1 is a perspective view illustrating a vehicle operating pedal apparatus according to a first embodiment.
Figure 2:
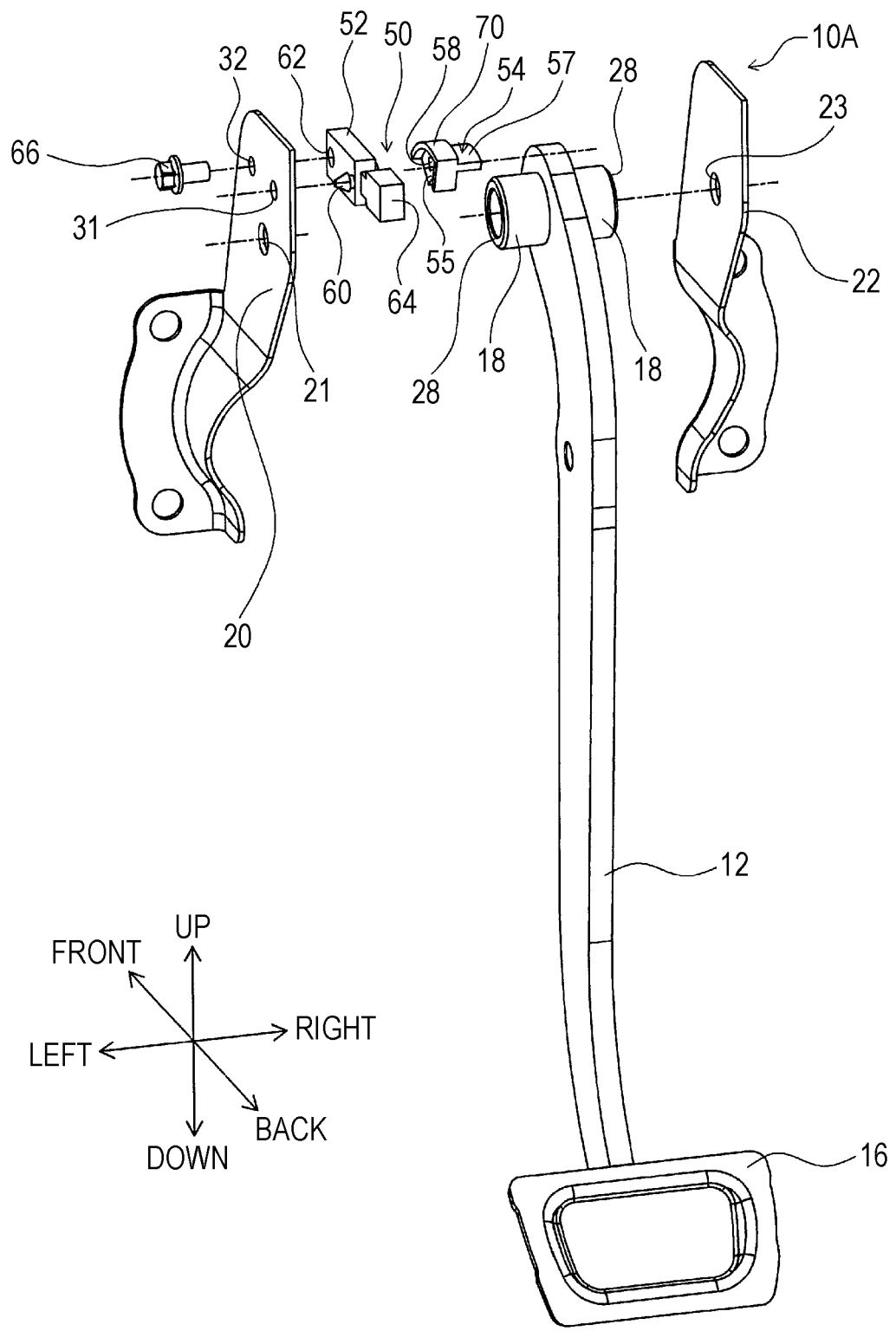
FIG. 2 is an exploded perspective view illustrating the vehicle operating pedal apparatus.
Figure 3:
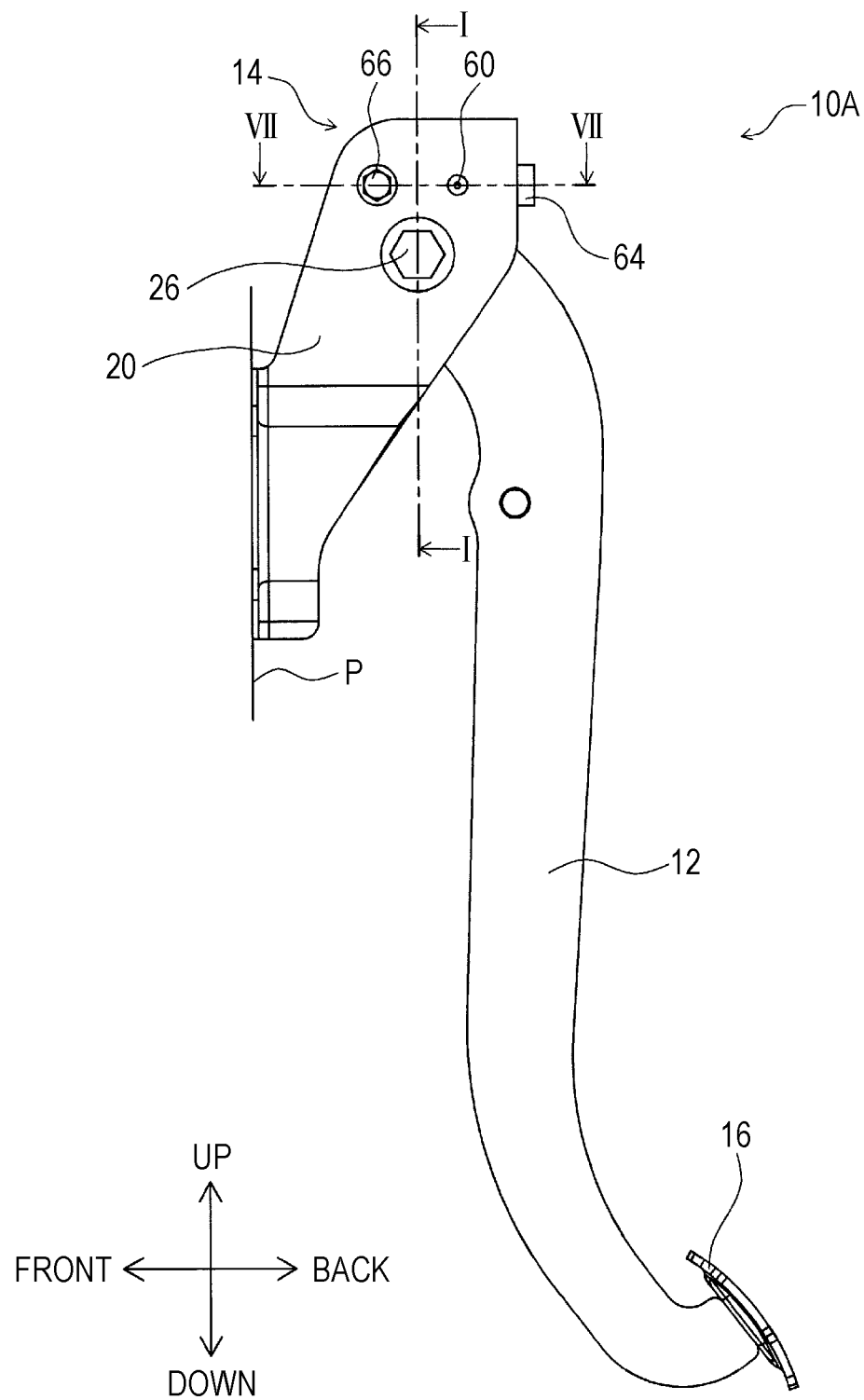
FIG. 3 is a side view illustrating the vehicle operating pedal apparatus.
Figure 4:
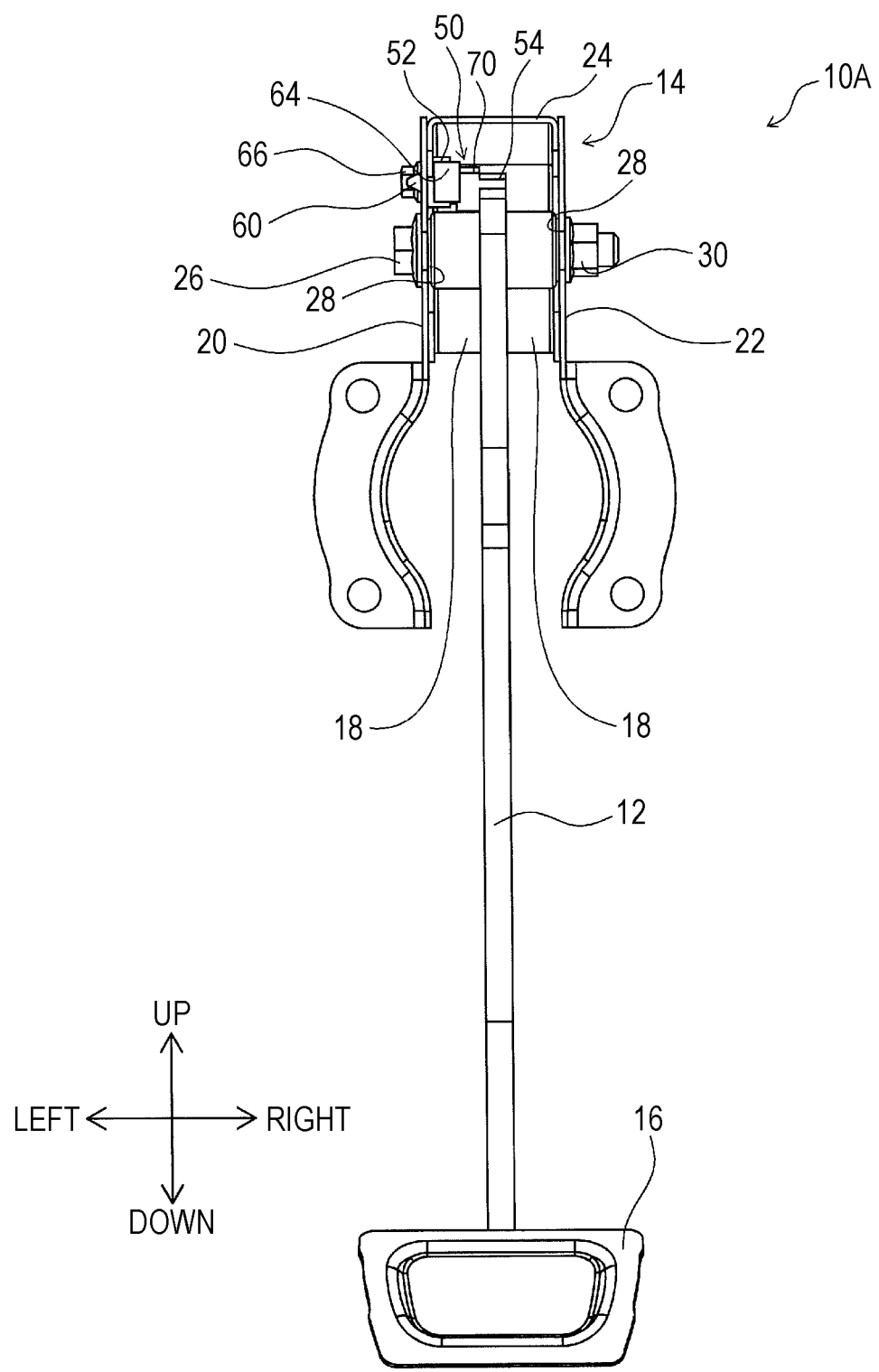
FIG. 4 is a front view illustrating the vehicle operating pedal apparatus.
Figure 6:
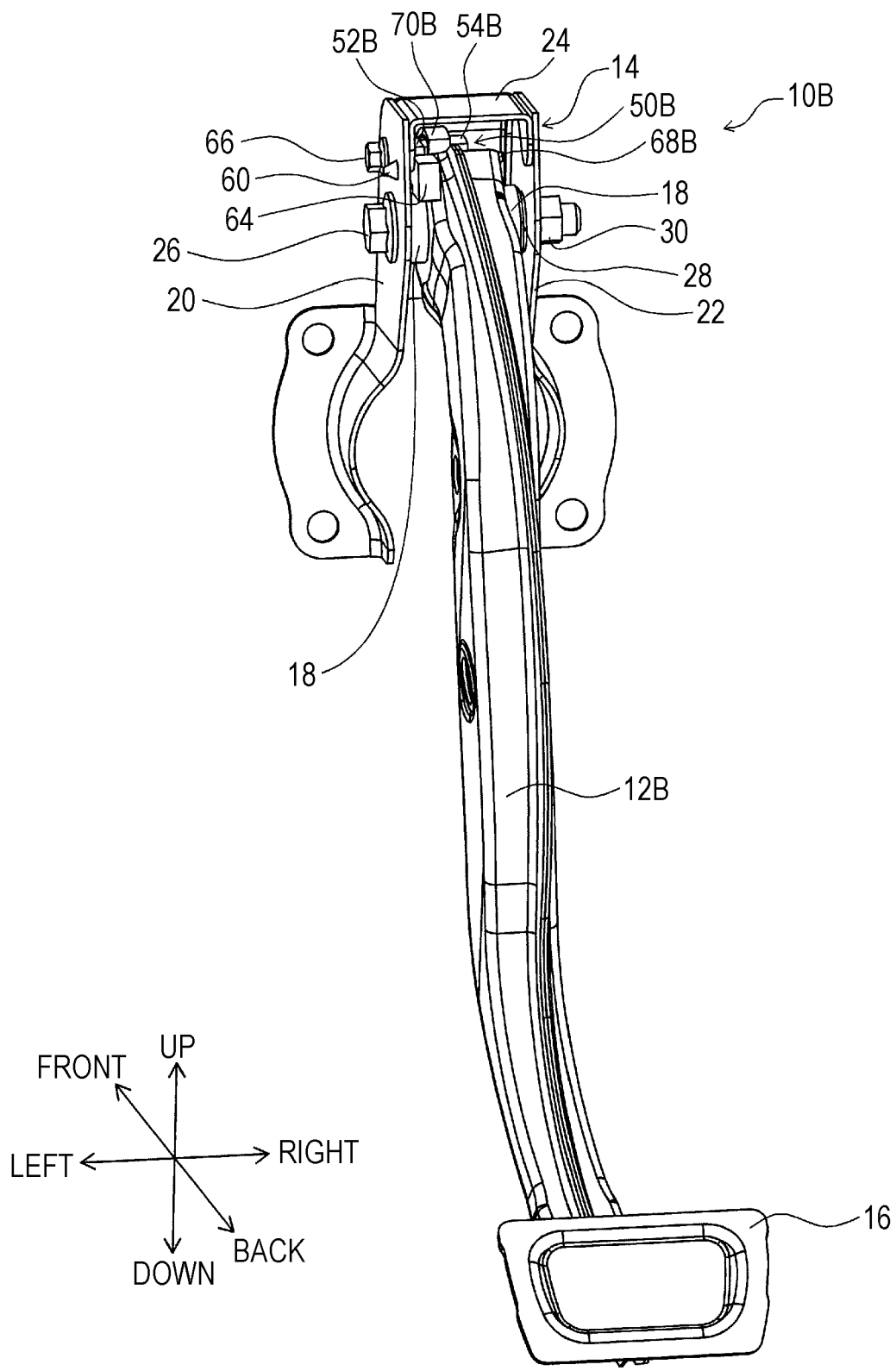
FIG. 6 is a perspective view illustrating a vehicle operating pedal apparatus according to a second embodiment.
Figure 7:
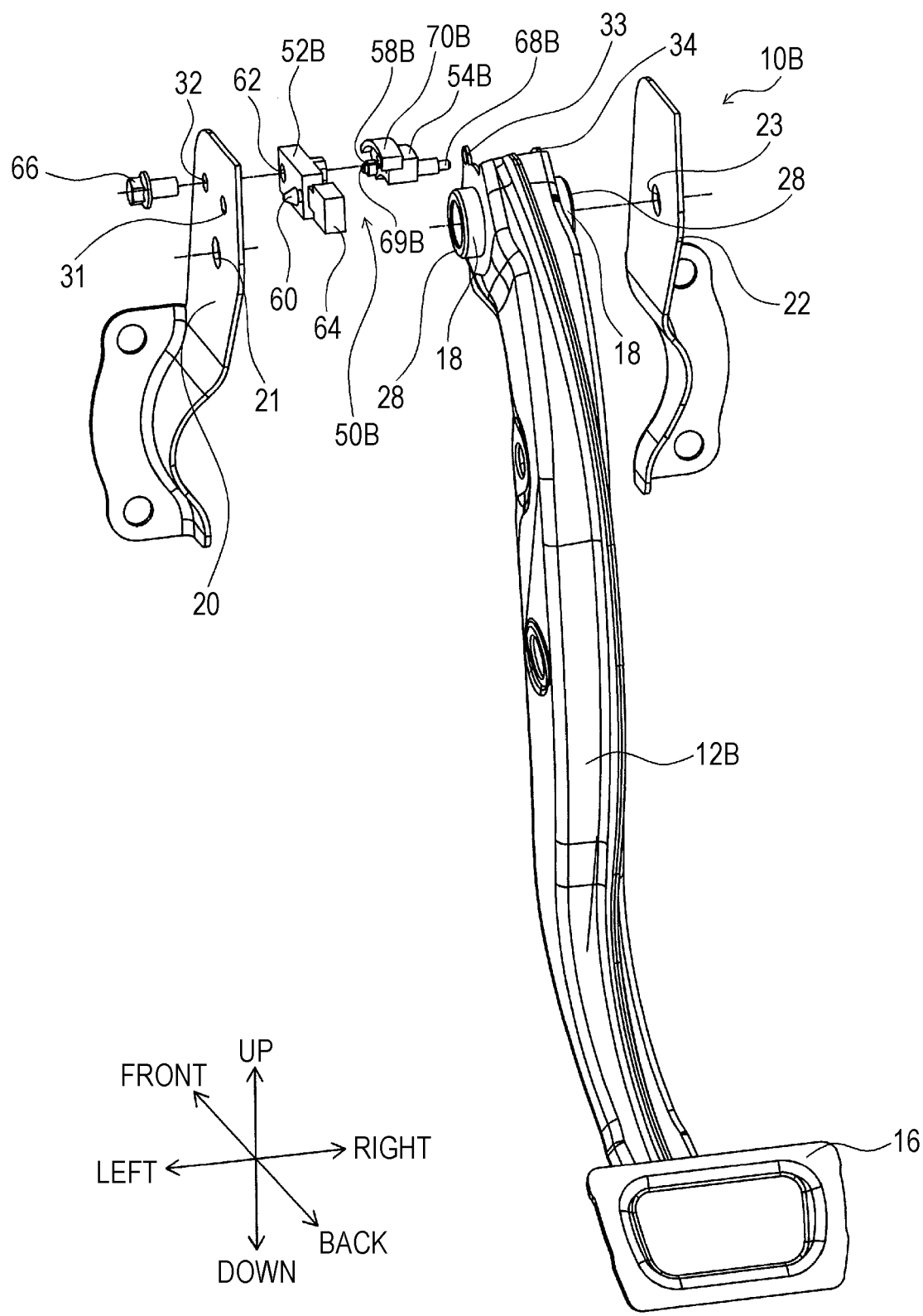
FIG. 7 is an exploded perspective view illustrating the vehicle operating pedal apparatus.
Figure 8:
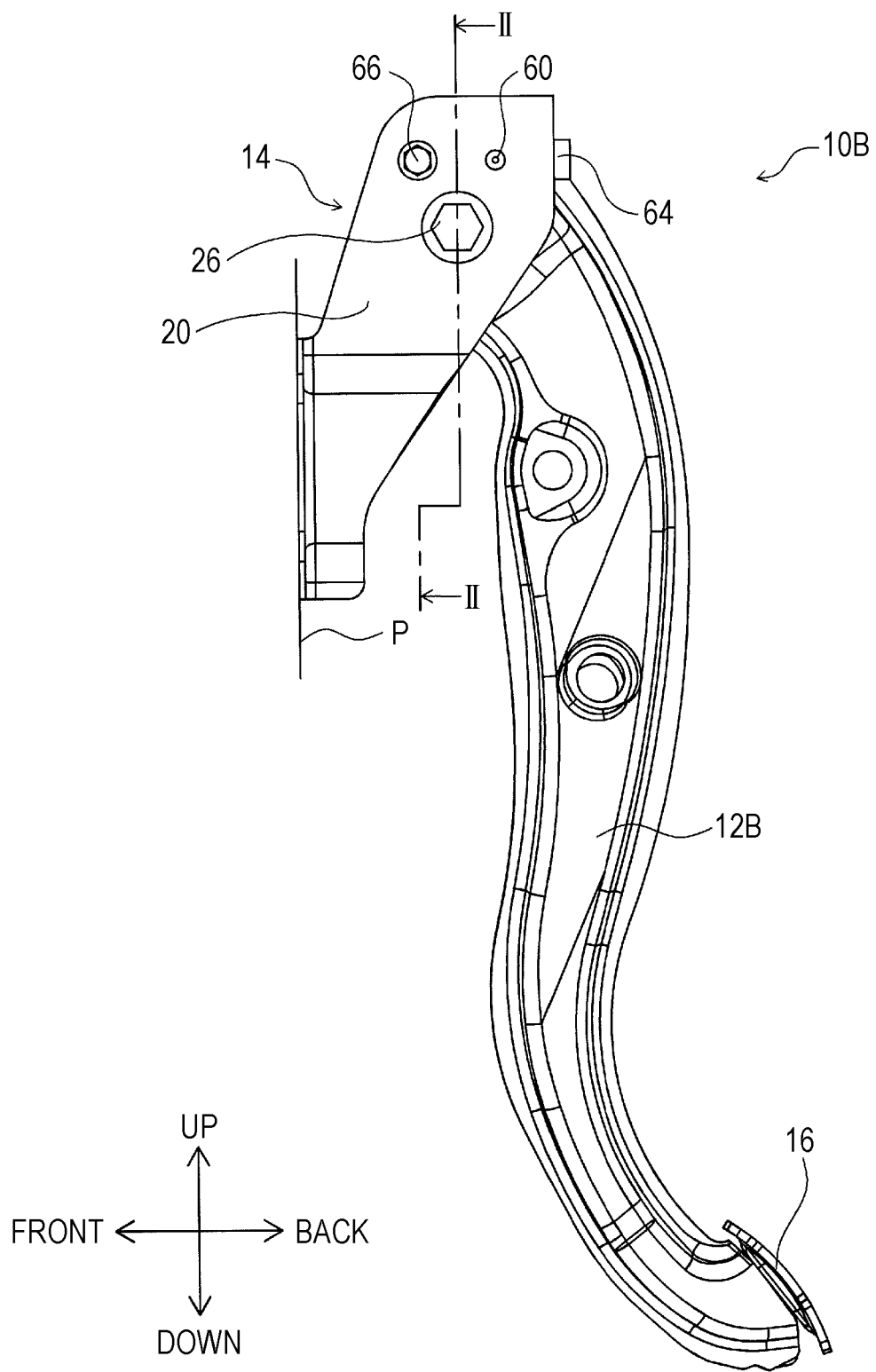
FIG. 8 is a side view illustrating the vehicle operating pedal apparatus.
Figure 9:
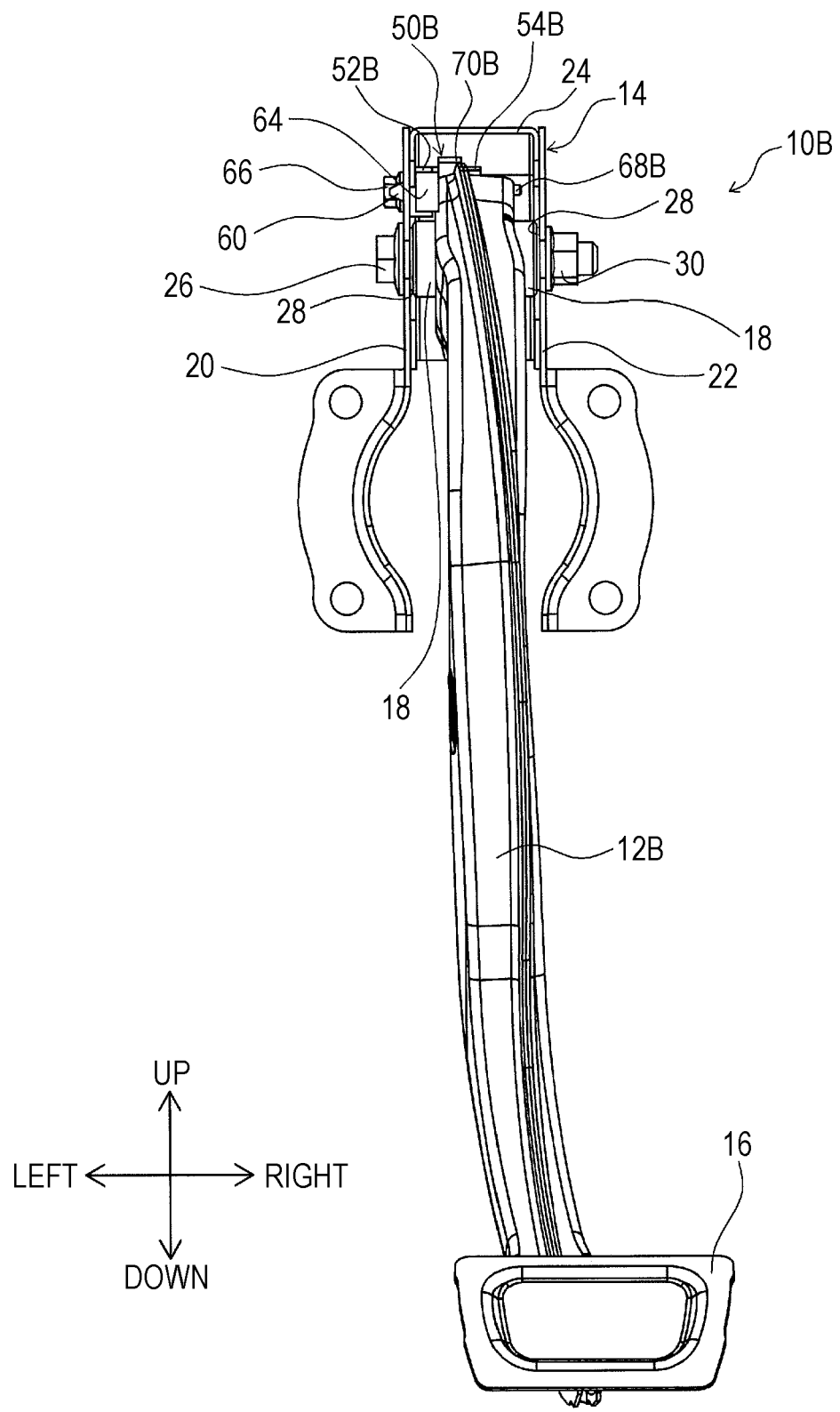
FIG. 9 is a front view illustrating the vehicle operating pedal apparatus.
Figure 10:
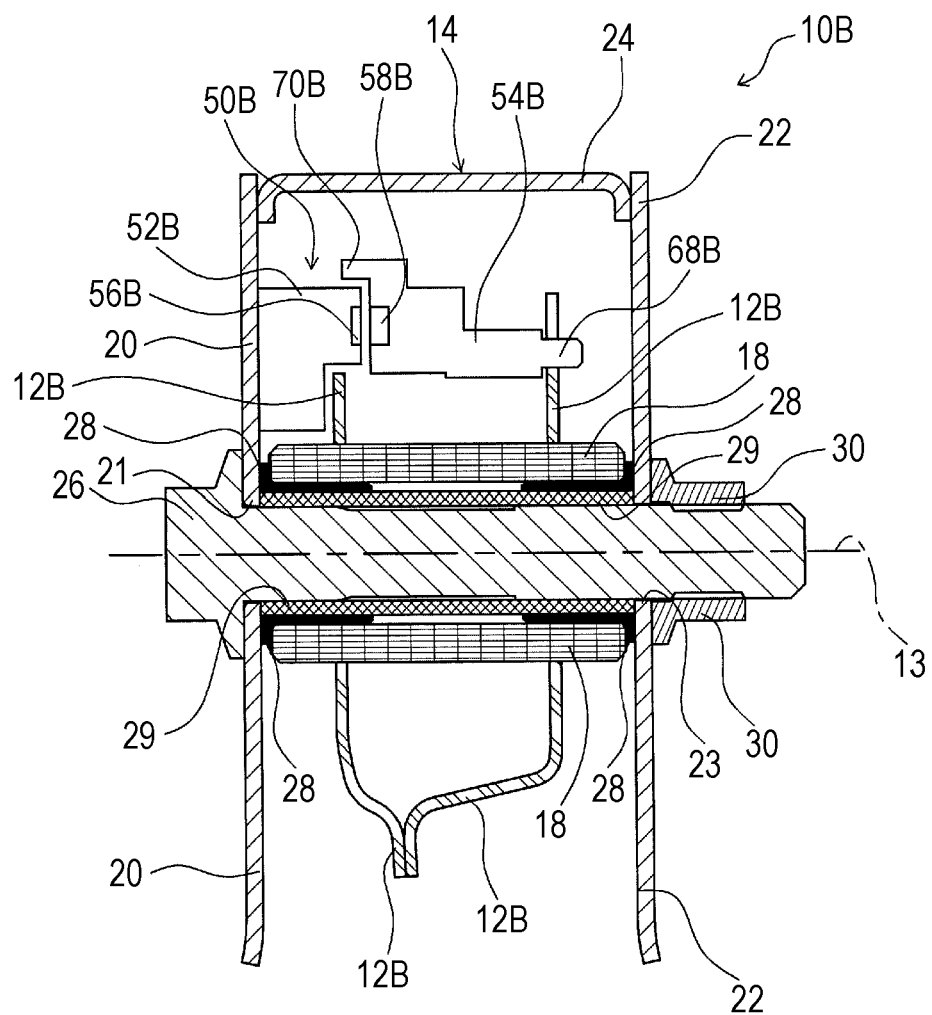
FIG. 10 is a diagram illustrating the vehicle operating pedal apparatus in a cross-section taken along line II-II in FIG. 8.
Figure 11:
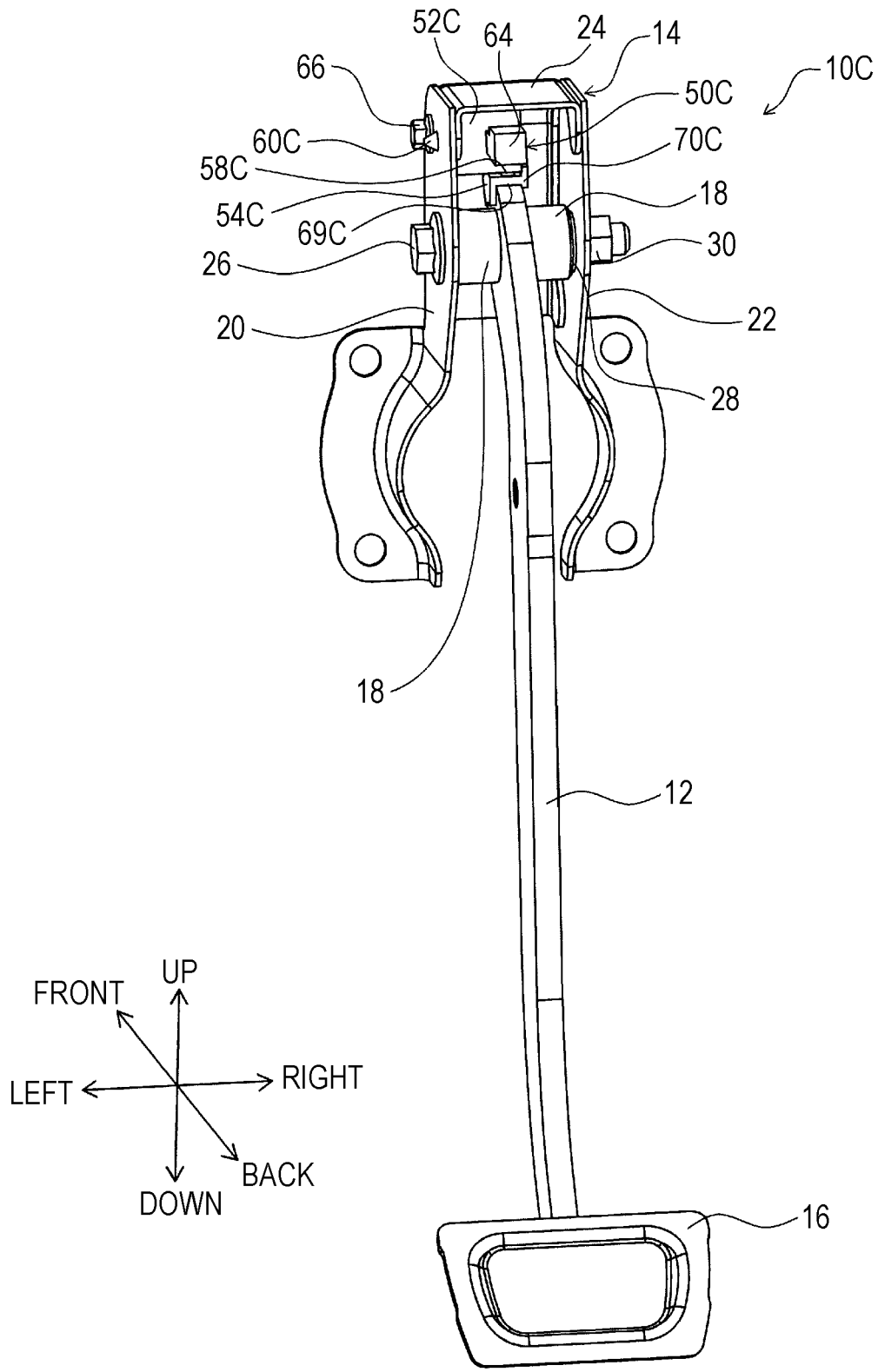
FIG. 11 is a perspective view illustrating a vehicle operating pedal apparatus according to a third embodiment.
Figure 12:
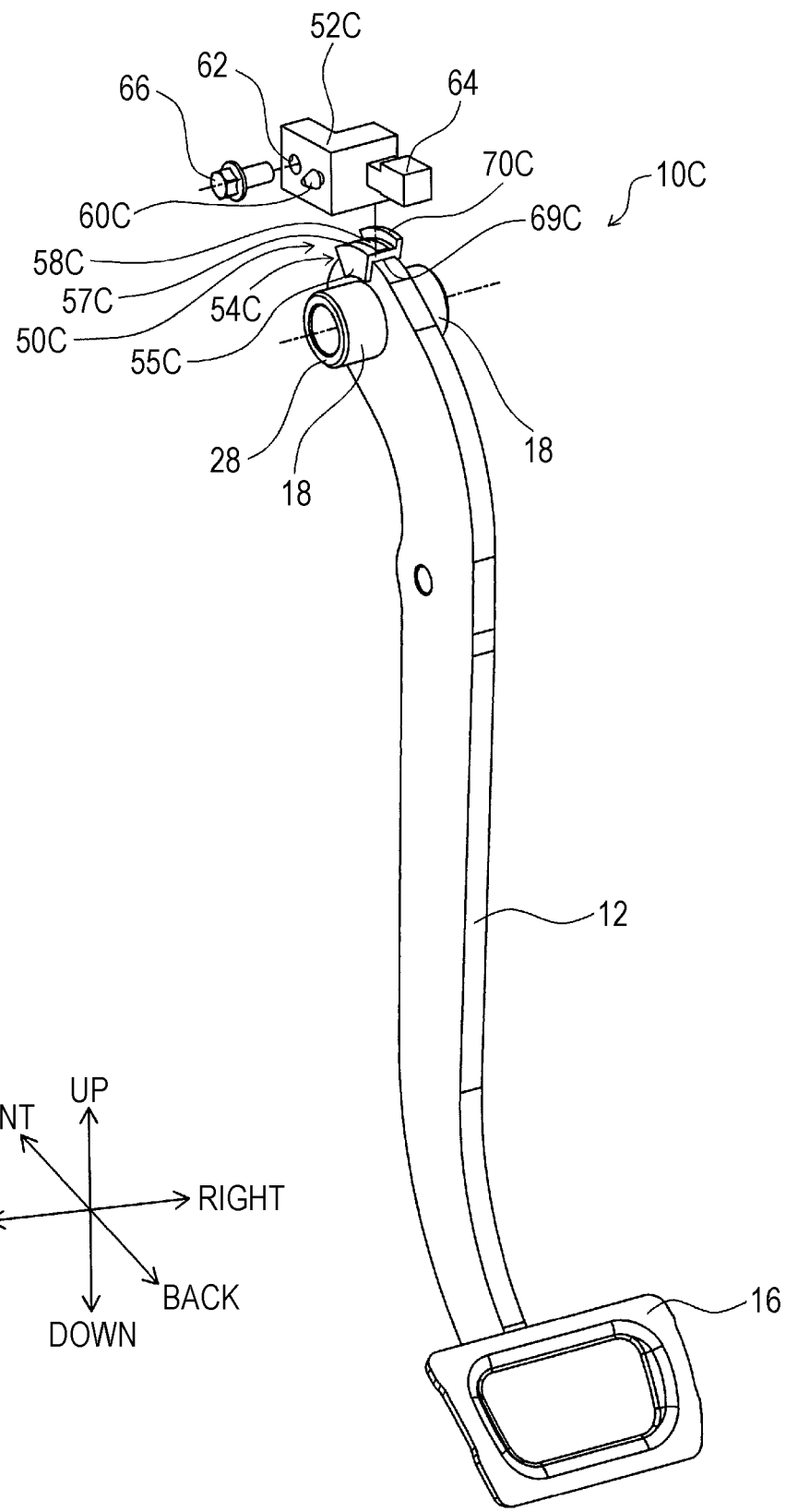
FIG. 12 is an exploded perspective view illustrating the vehicle operating pedal apparatus.
Figure 13:
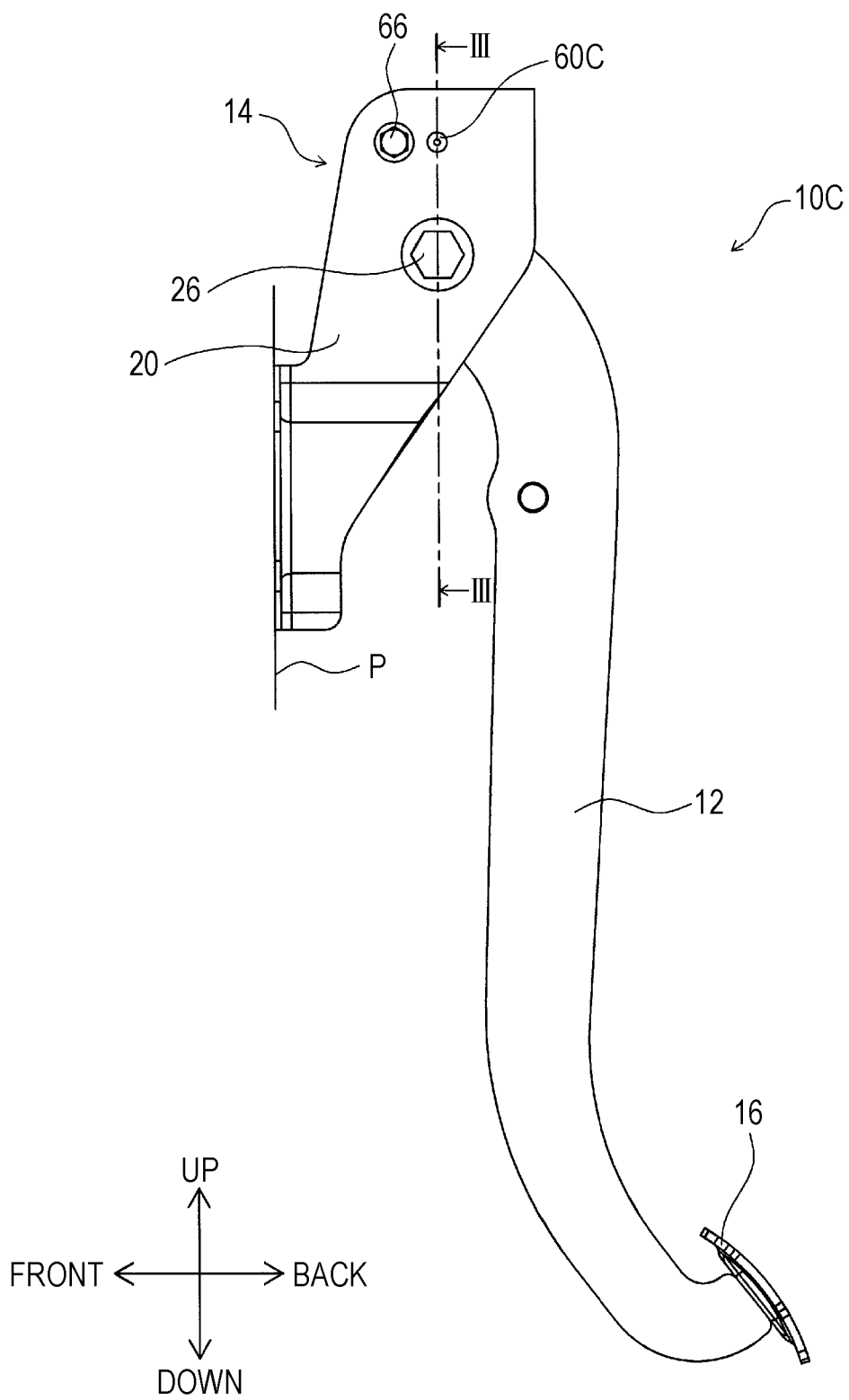
FIG. 13 is a side view illustrating the vehicle operating pedal apparatus.
Figure 14:
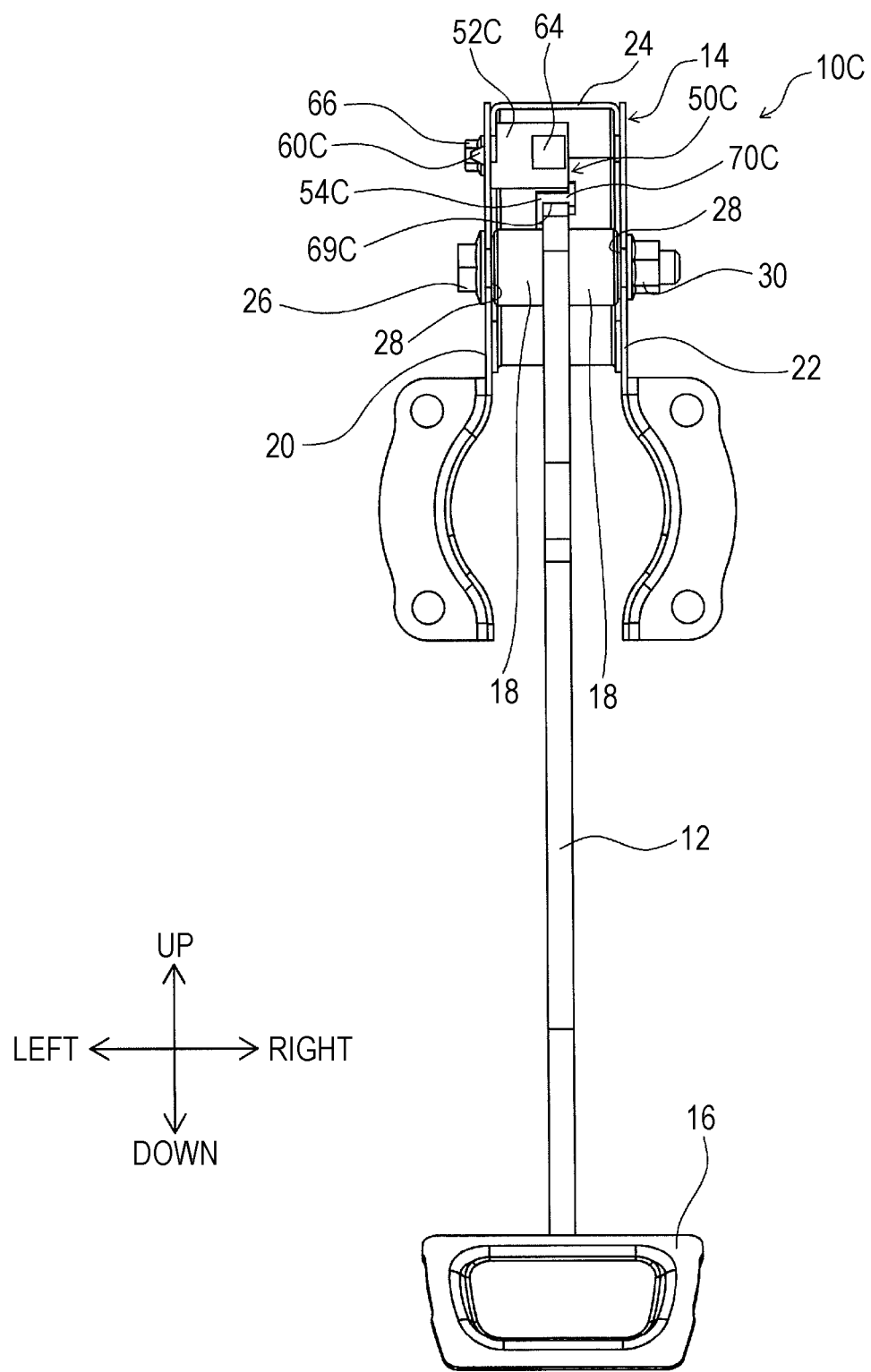
FIG. 14 is a front view illustrating the vehicle operating pedal apparatus.
Figure 15:
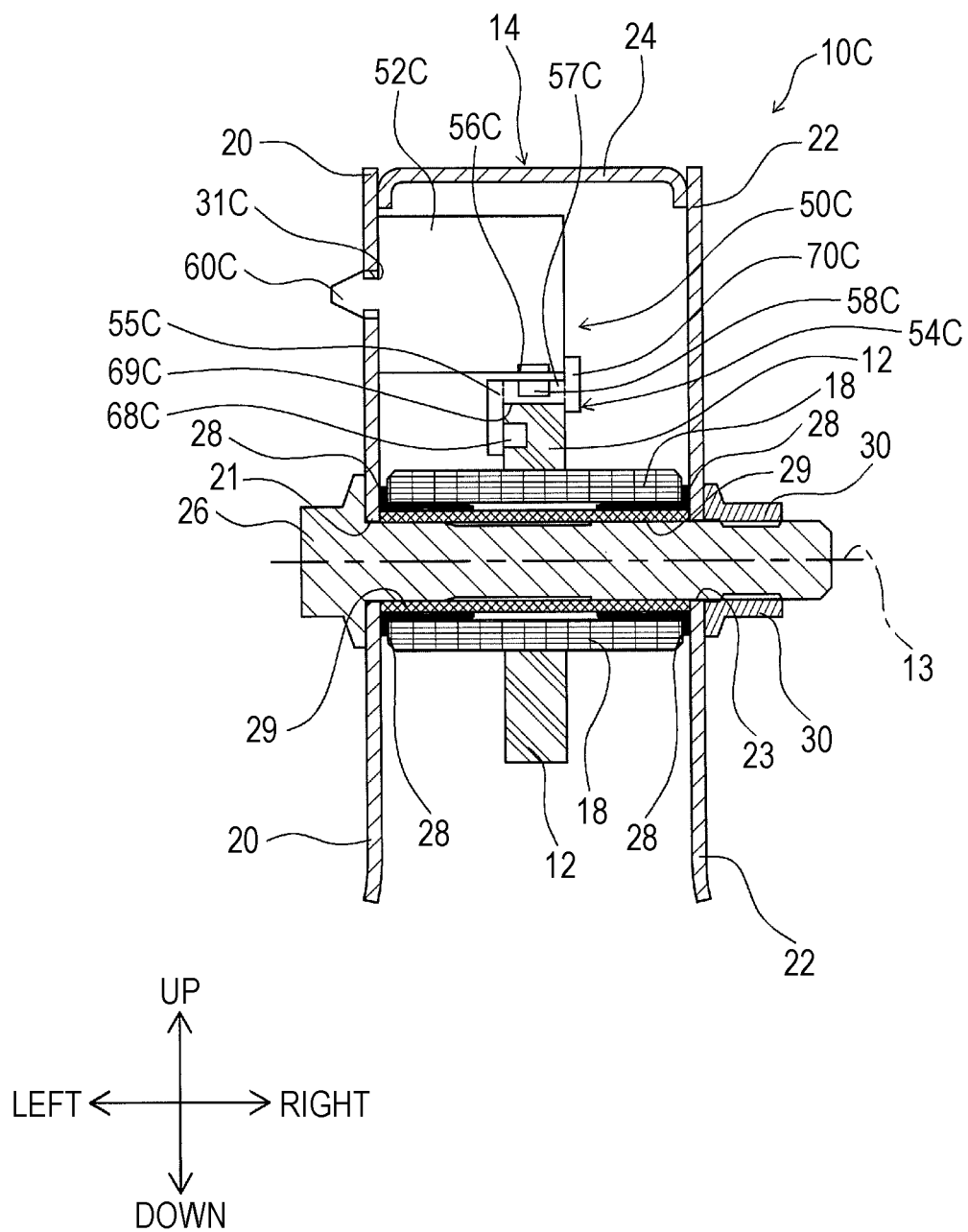
FIG. 15 is a diagram illustrating the vehicle operating pedal apparatus in a cross-section taken along line III-III in FIG. 13.
Figure 16:
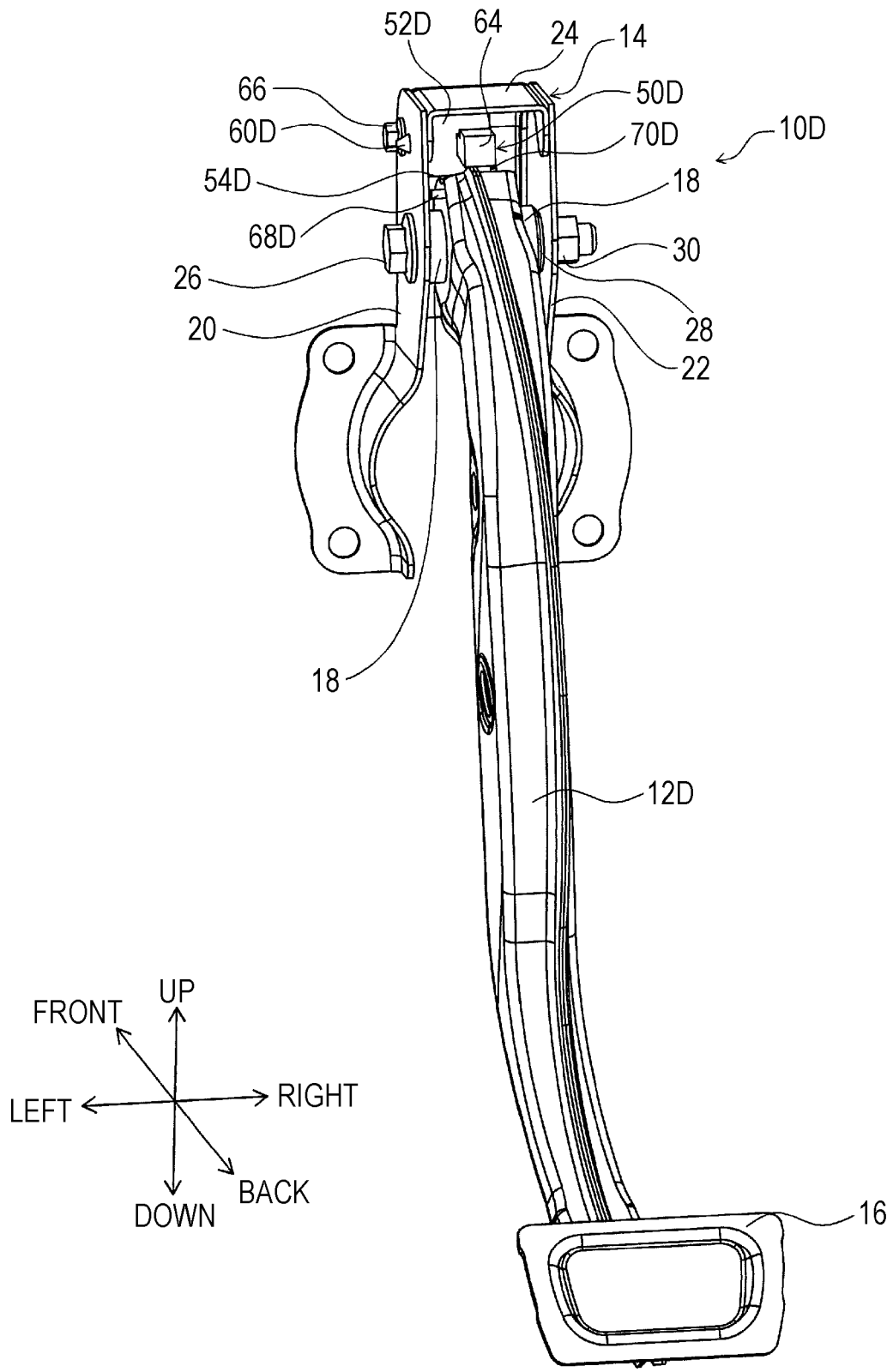
FIG. 16 is a perspective view illustrating a vehicle operating pedal apparatus according to a fourth embodiment.
Figure 17:
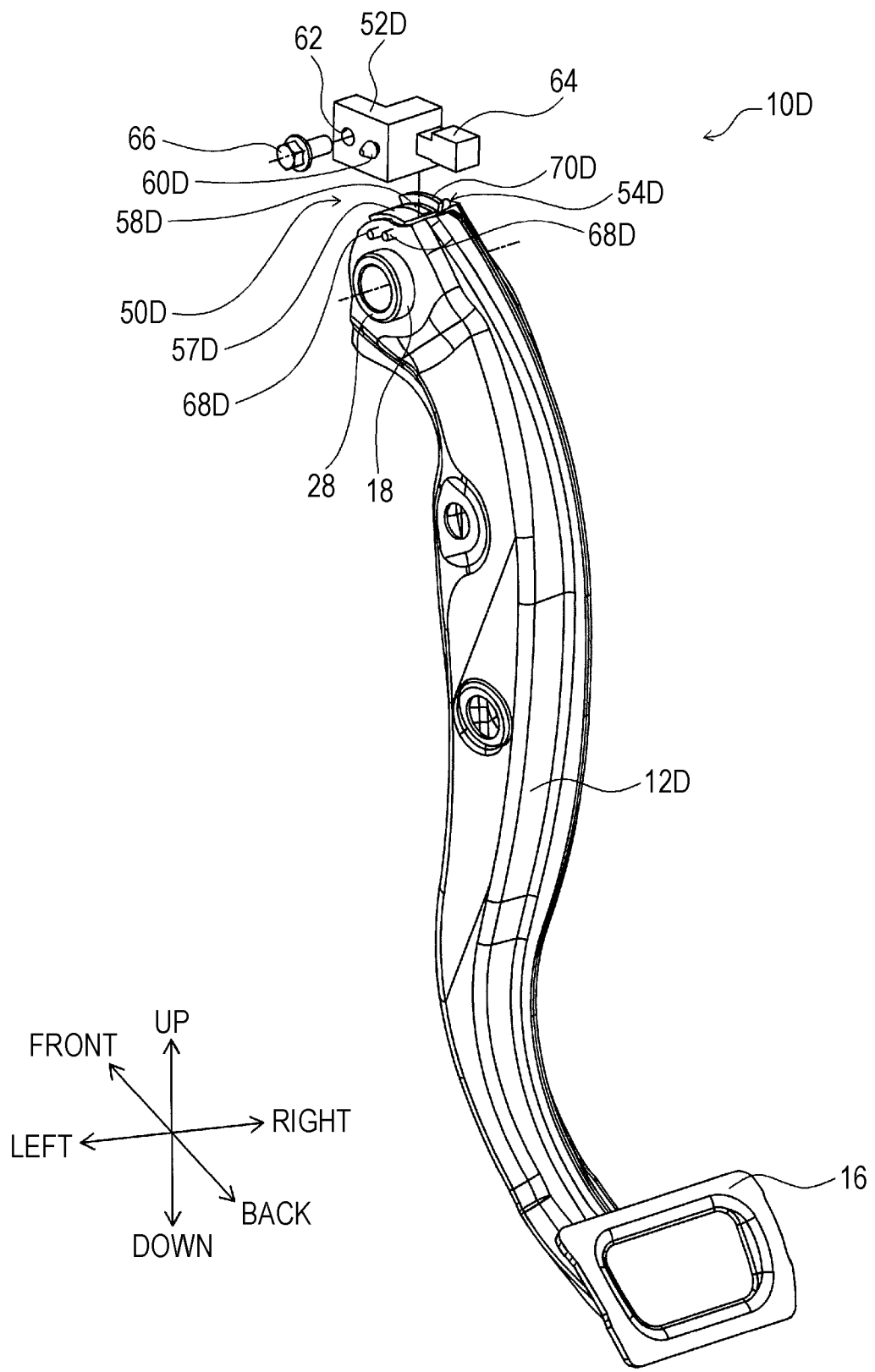
FIG. 17 is an exploded perspective view illustrating the vehicle operating pedal apparatus.
Figure 18:
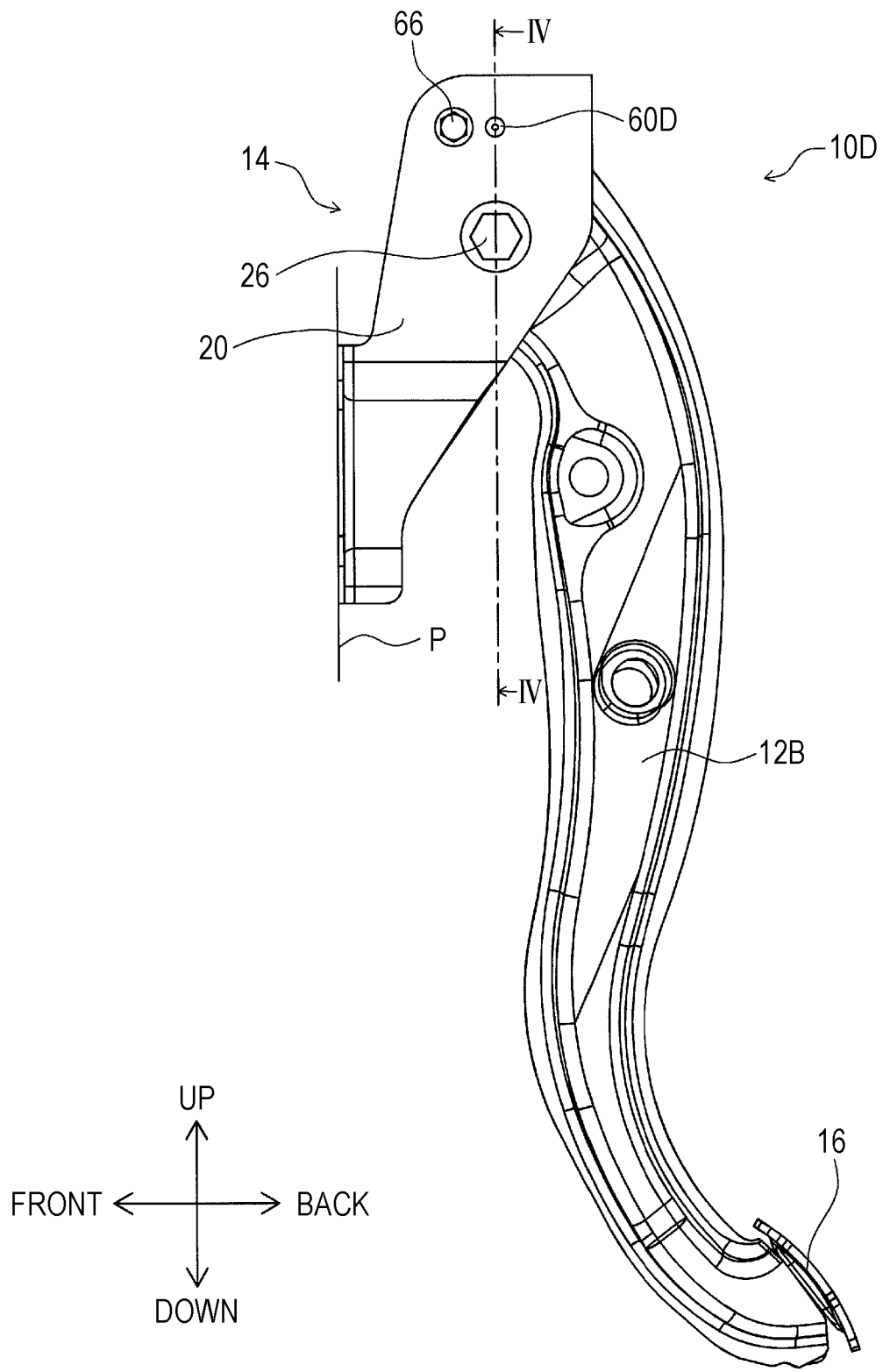
FIG. 18 is a side view illustrating the vehicle operating pedal apparatus.
Figure 19:
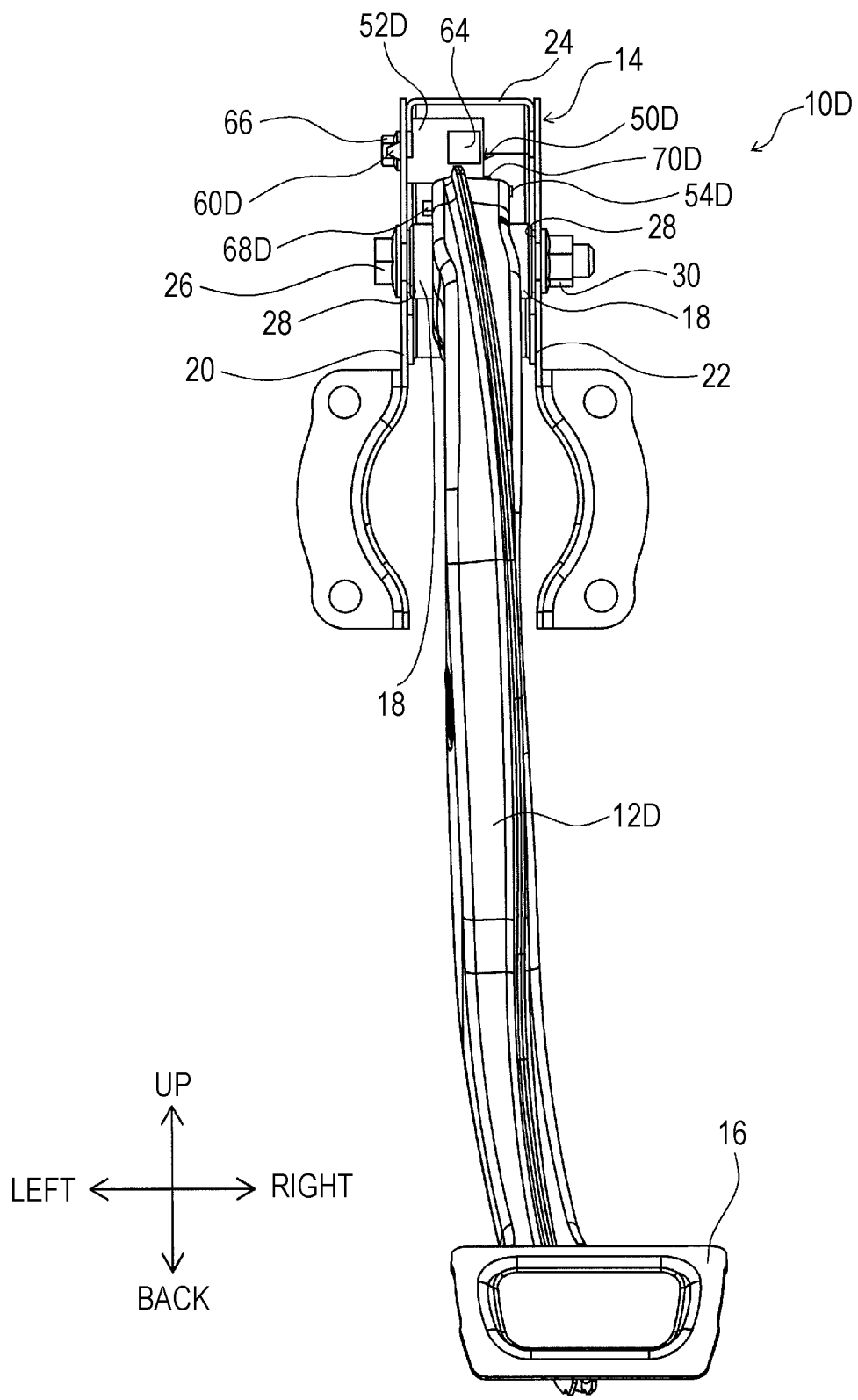
FIG. 19 is a front view illustrating the vehicle operating pedal apparatus.
Figure 20:
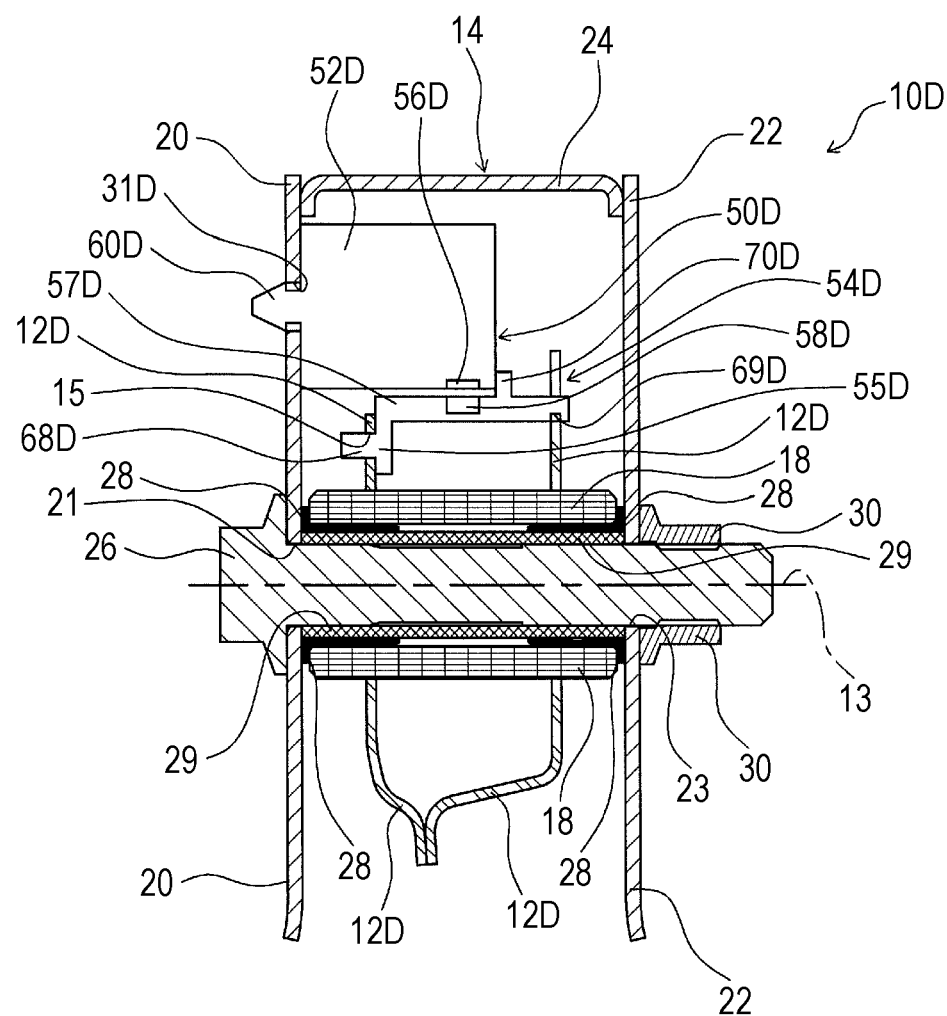
FIG. 20 is a diagram illustrating the vehicle operating pedal apparatus in a cross-section taken along line IV-IV in FIG. 18.
Figure 21:
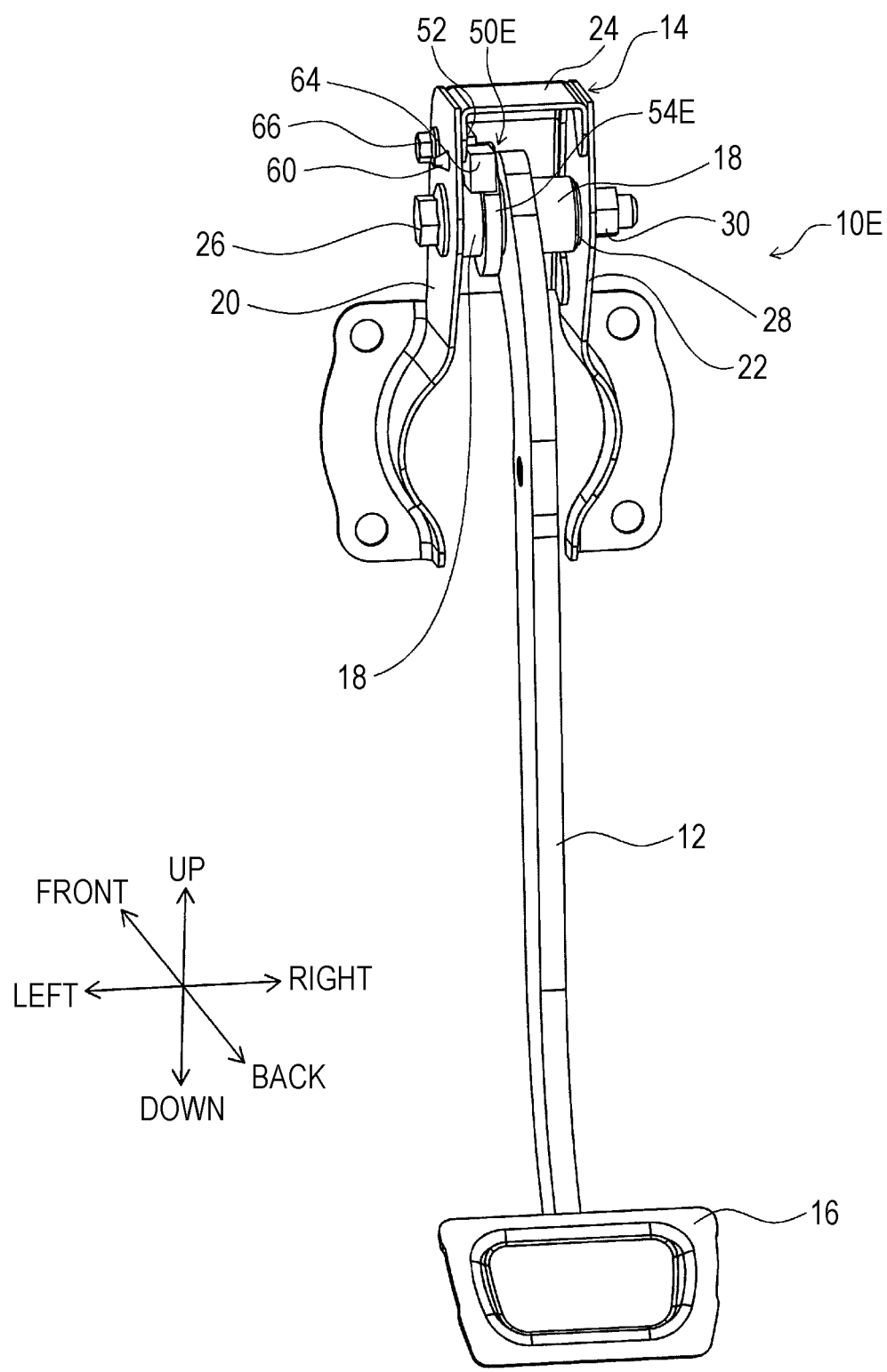
FIG. 21 is a perspective view illustrating a vehicle operating pedal apparatus according to a fifth embodiment.
Figure 22:
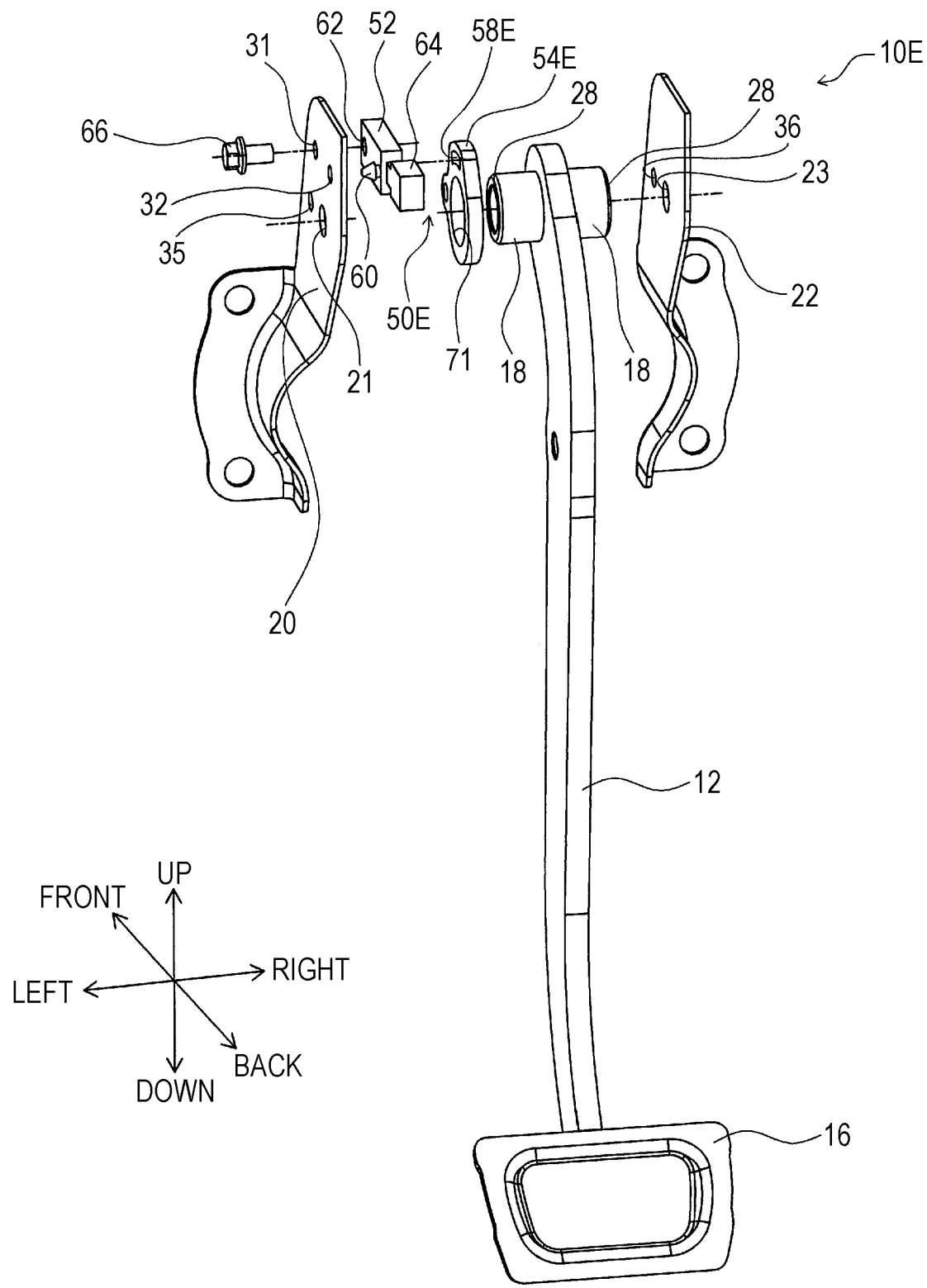
FIG. 22 is an exploded perspective view illustrating the vehicle operating pedal apparatus.
Figure 23:
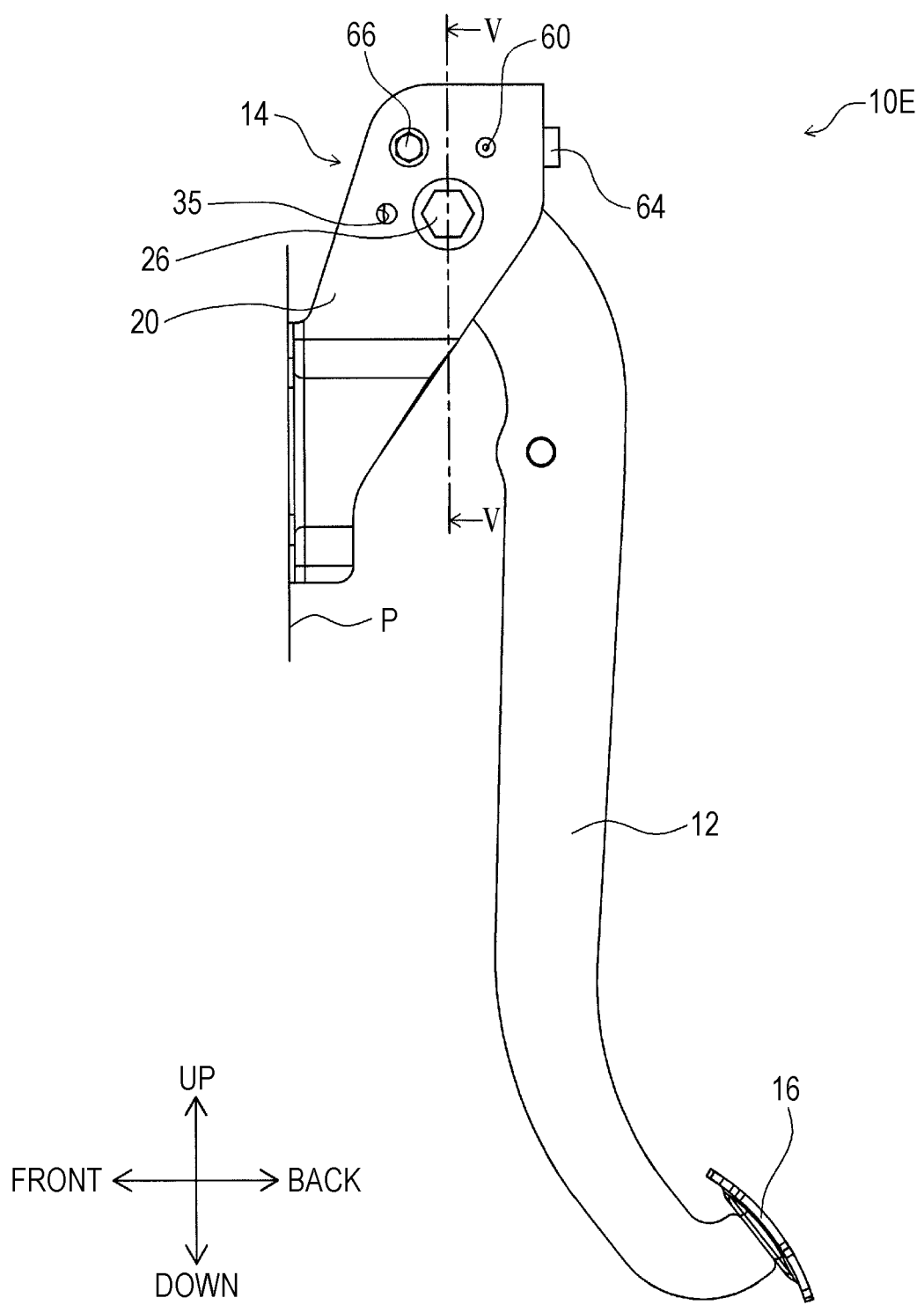
FIG. 23 is a side view illustrating the vehicle operating pedal apparatus.
Figure 24:
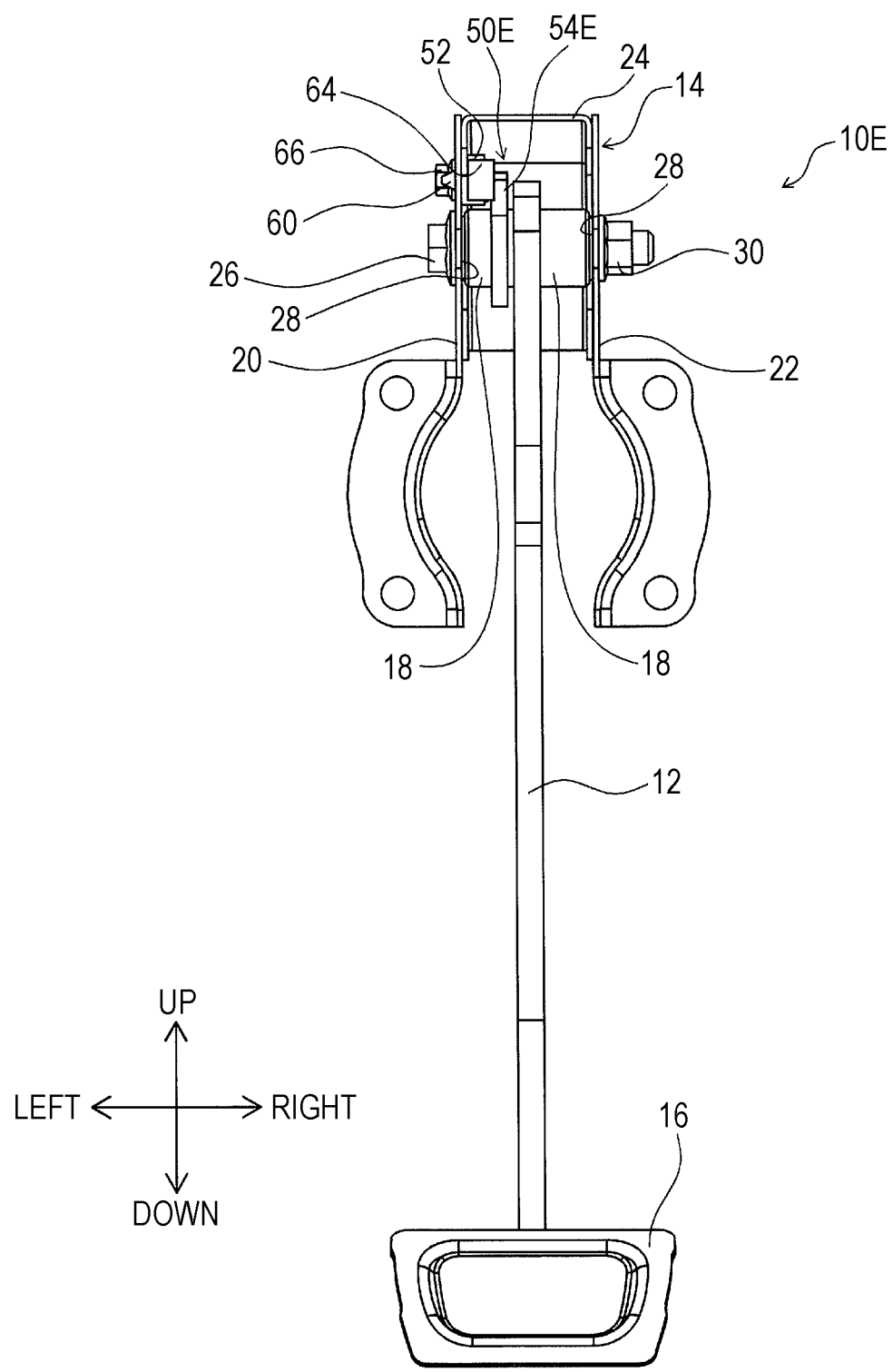
FIG. 24 is a front view illustrating the vehicle operating pedal apparatus.
Figure 25:
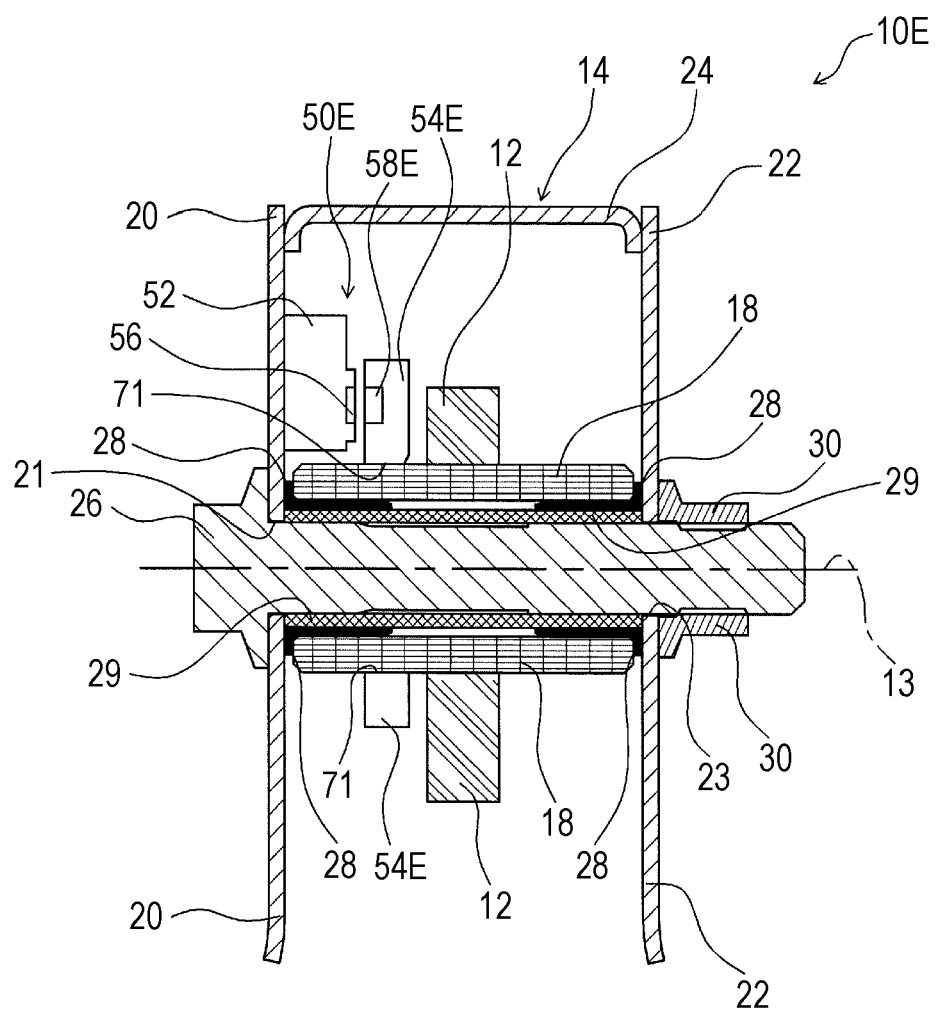
FIG. 25 is a diagram illustrating the vehicle operating pedal apparatus in a cross-section taken along line V-V in FIG. 23.
Figure 26:
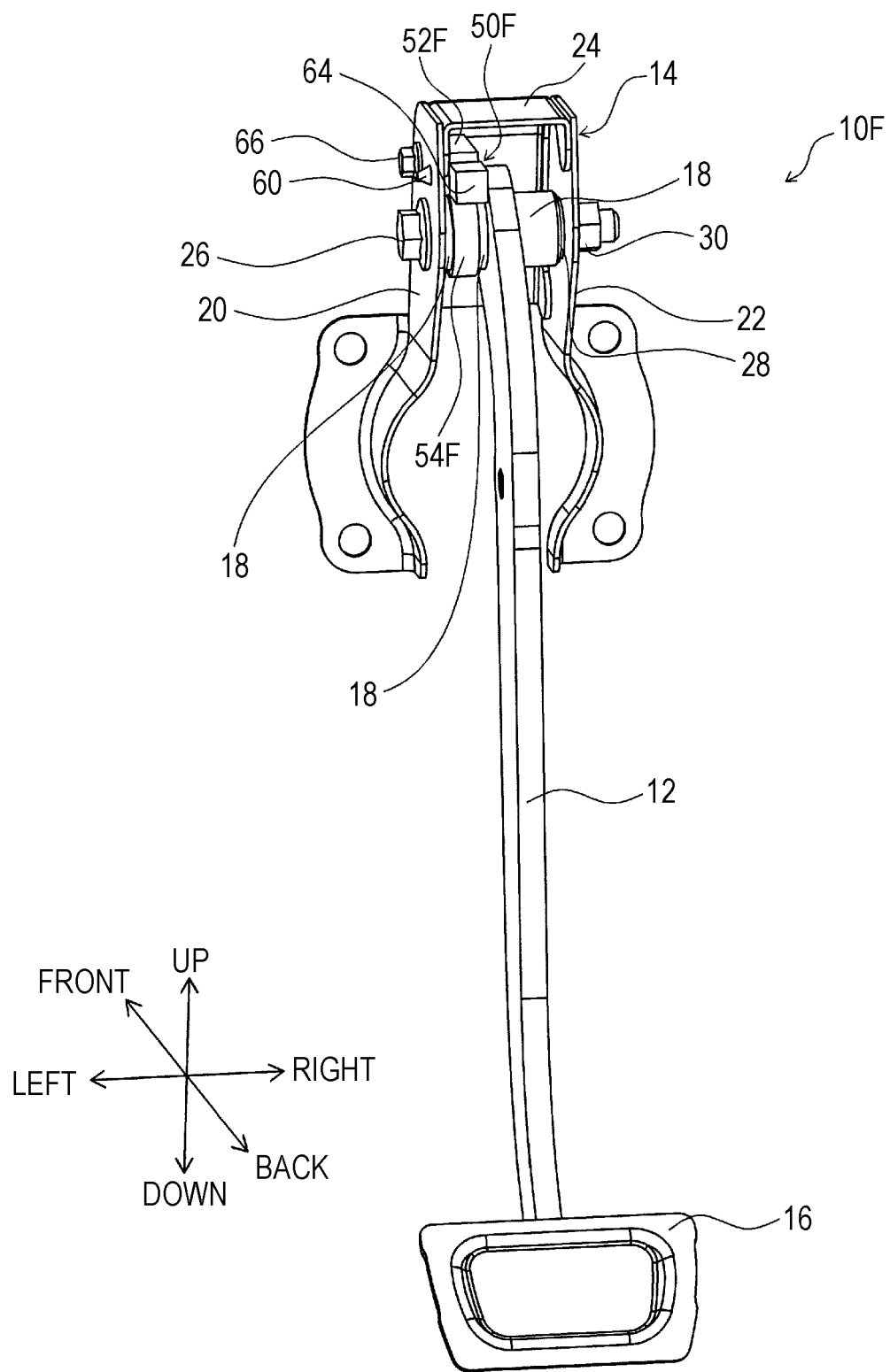
FIG. 26 is a perspective view illustrating a vehicle operating pedal apparatus according to a sixth embodiment.
Figure 27:
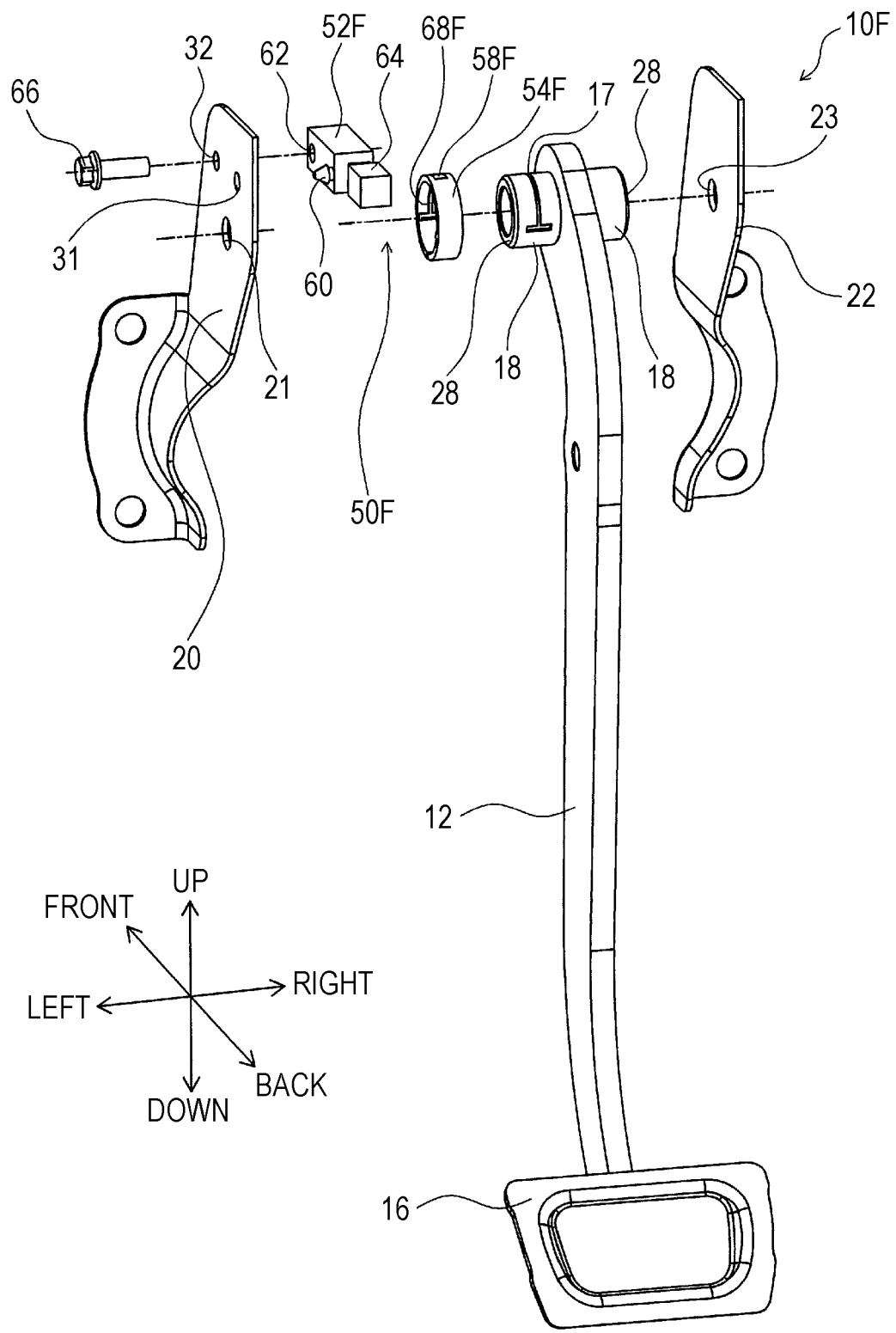
FIG. 27 is an exploded perspective view illustrating the vehicle operating pedal apparatus.
Figure 28:
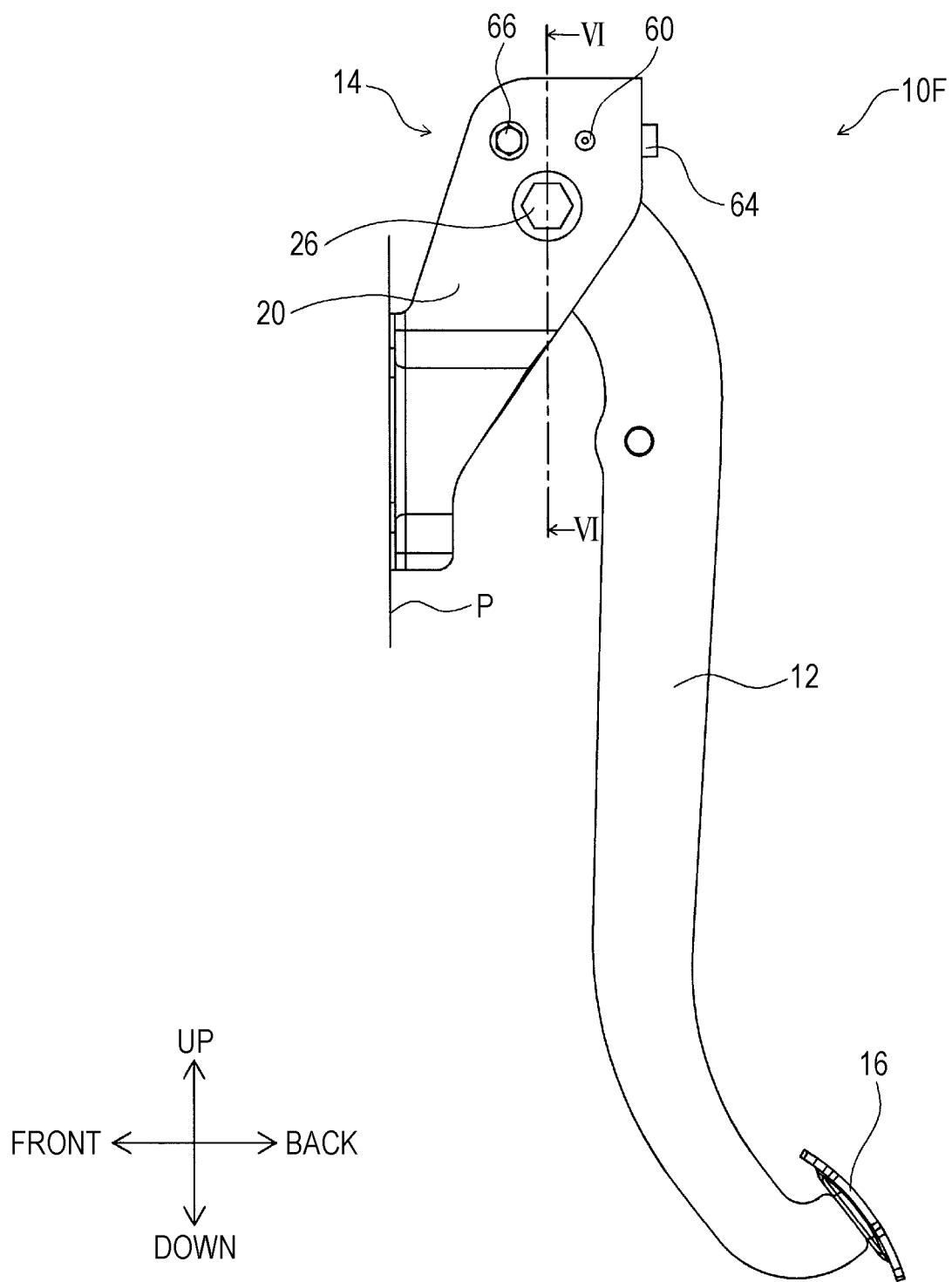
FIG. 28 is a side view illustrating the vehicle operating pedal apparatus.
Figure 29:
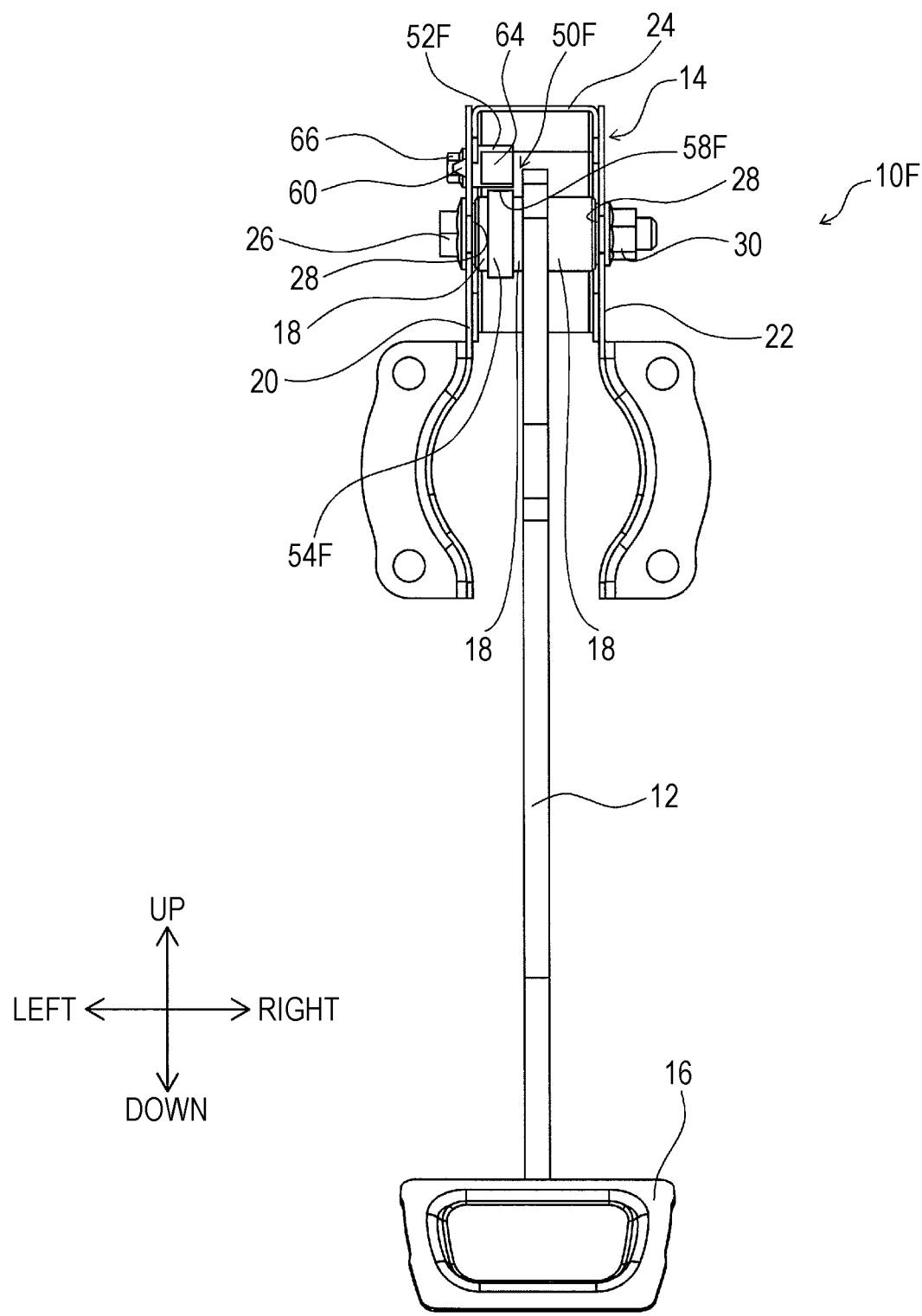
FIG. 29 is a front view illustrating the vehicle operating pedal apparatus.
Figure 30:
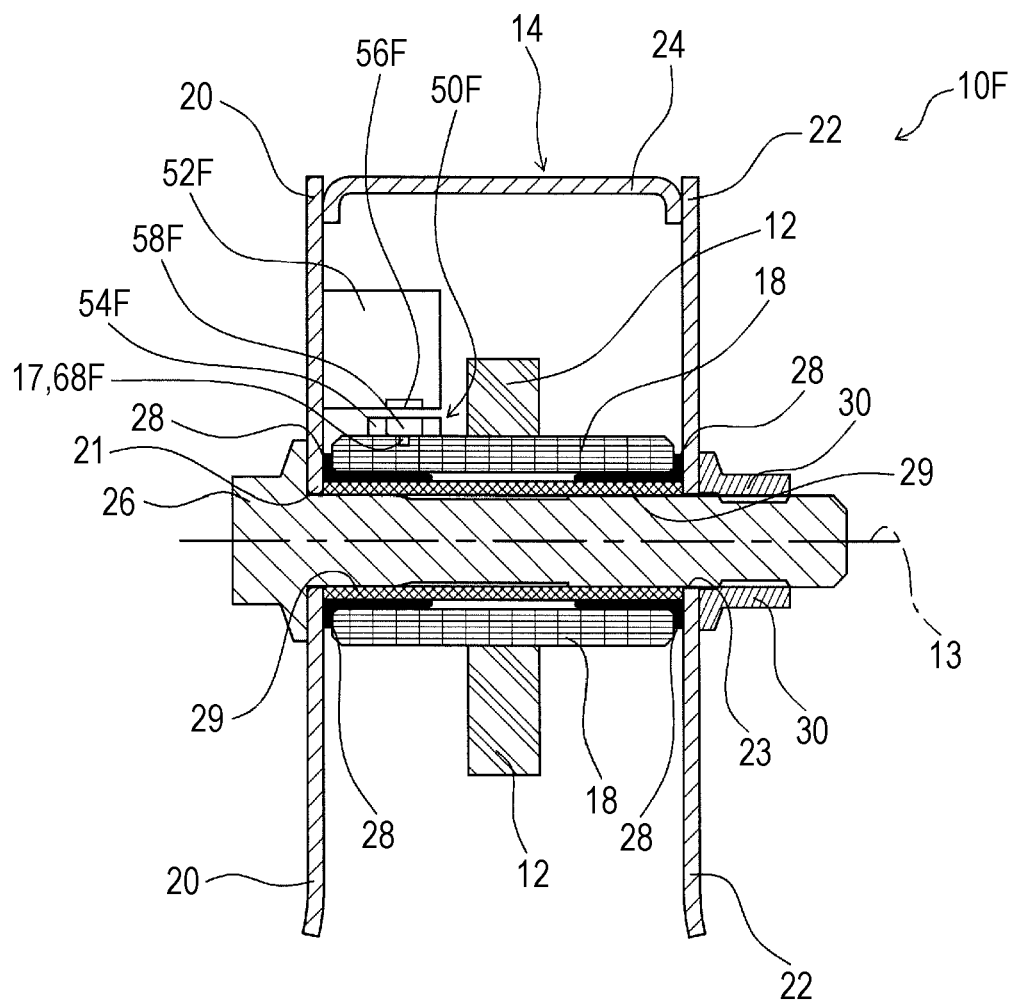
FIG. 30 is a diagram illustrating the vehicle operating pedal apparatus in a cross-section taken along line VI-VI in FIG. 28.

A vehicle operating pedal apparatus according to the present invention is described hereinafter on the basis of materialized embodiments thereof with reference to the drawings. In the embodiments, the vehicle operating pedal apparatus according to the present invention is attached to a vehicle to be used as a brake pedal. However, the vehicle operating pedal apparatus according to the present invention may be used as a vehicle pedal (for example, the accelerator pedal or clutch pedal) other than the brake pedal.

The drawings used for the following description are drawn, omitting part of a basic configuration. The dimension ratio and the like of each portion drawn are not necessarily correct. The same reference signs are assigned to parts having correspondences in the embodiments. Furthermore, in terms of alphabet letters added to the reference signs, "A" indicates a first embodiment, "B" indicates a second embodiment, "C" indicates a third embodiment. "D" indicates a fourth embodiment, "E" indicates a fifth embodiment, and "F" indicates a sixth embodiment. However, the same reference signs without the above added alphabet letters are assigned to parts that are substantially common among the embodiments. In the second and subsequent embodiments, a detailed description is omitted. Moreover, when parts and the like are collectively mentioned without distinguishing the embodiments, a description is given, using the reference signs without the above added alphabet letters.

Moreover, the directions in the drawings are as described in the drawings. However, in the side views of FIGS. 3, 8, 13, 18, 23, 28, 36, and 37, the direction into the page is rightward, and the direction out of the page is leftward. In other words, the direction orthogonal to the page in FIGS. 3, 8, 13, 18, 23, 28, 36, and 37 is the left-and-right direction.

Moreover, in the front views of FIGS. 4, 9, 14, 19, 24, and 29, the direction into the page is forward, and the direction out of the page is backward. In other words, the direction orthogonal to the page in FIGS. 4, 9, 14, 19, 24, and 29 is the front-and-back direction. The same points are valid with regard to the cross-sectional views of FIGS. 5, 10, 15, 20, 25, and 30 to 34.

Figure 35:
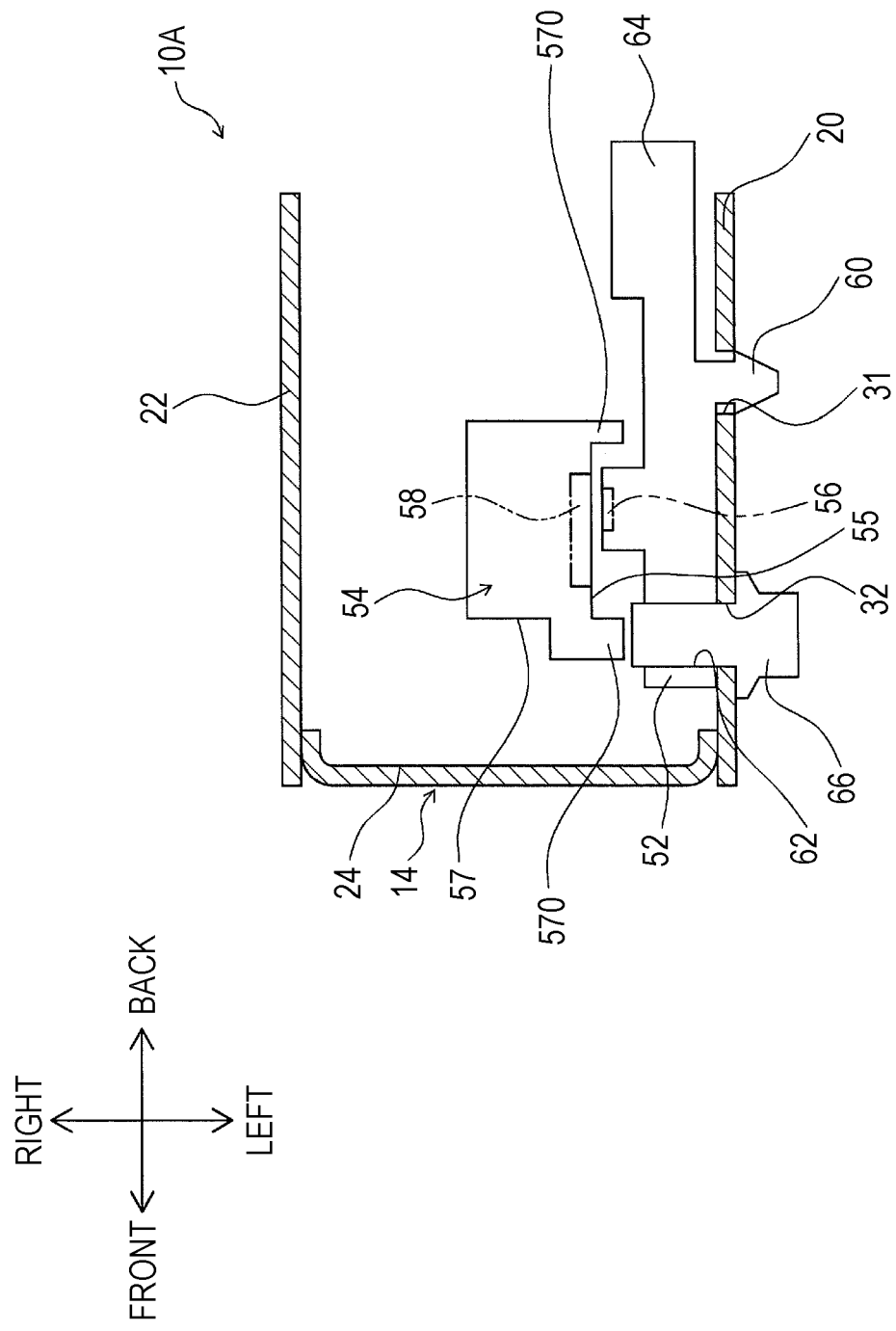
FIG. 35 is a diagram illustrating a fourth modification of the vehicle operating pedal apparatus according to the first embodiment in a cross-section taken along line VII-VII in FIG. 3.

Moreover, in the cross-sectional view of FIG. 35, the direction into the page is downward, and the direction out of the page is upward. In other words, the direction orthogonal to the page in FIG. 35 is the up-and-down direction.

(1) First Embodiment

As illustrated in FIGS. 1 to 5, a vehicle operating pedal apparatus 10A according to a first embodiment includes an operating pedal 12 and a support member 14, and is mounted on a vehicle. A stepping part 16 is provided at the lower end of the operating pedal 12. A tubular boss 18 is fixed to the upper end of the operating pedal 12, penetrating the upper end. A collar 29 on which a pair of bushings 28 is fitted at the left and right ends of the collar 29 is fitted in the boss 18. Consequently, the tubular portions of the bushings 28 are placed between the boss 18 and the collar 29.

The support member 14 includes a left support member 20, a right support member 22, and an upper middle support member 24, and is fixed to the vehicle (for example, a dash panel P). The left support member 20 and the right support member 22 are coupled to the upper middle support member 24 lion the front ends across the upper ends of the left support member 20 and the right support member 22, and face each other in the left-and-right direction. The left support member 20 is provided with a left pivot hole 21. The right support member 22 is provided with a right pivot hole 23. The boss 18 of the operating pedal 12 is disposed between the left pivot hole 21 and the right pivot hole 23 to cause the left pivot hole 21 and the right pivot hole 23 to communicate with each other in the left-and-right direction via the collar 29 in the boss 18. With the pivot holes communicating with each other, a pivot bolt 26 is passed through the collar 29 in the boss IS from the left pivot hole 21 to the right pivot hole 23.

The head of the pivot bolt 26 is in contact with the left support member 20 while the end of the pivot bolt 26 protrudes to the right from the right support member 22. The protruding portion of the pivot bolt 26 is screwed into a nut 30. Consequently, the left and right ends of the collar 29 are sandwiched between the left support member 20 and the right support member 22 to maintain a constant distance in the left-and-right direction between (the left pivot hole 21 of) the left support member 20 and (the right pivot hole 23 of) the right support member 22. Furthermore, a circular flange of one of the bushings 28 is placed at the left end of the boss 18 and between the boss 18 and the left support member 20. Moreover, the circular flange of the other bushing 28 is placed at the right end of the boss 18 and between the boss 18 and the right support member 22.

In this manner, the boss 18 at the upper end of the operating pedal 12 is supported between (the left pivot bole 21 of) the left support member 20 and (the right pivot hole 23 of) the right support member 22 in such a manner as to allow pivotal rotation. When the stepping part 16 at the lower end of the operating pedal 12 is stepped forward, the operating pedal 12 pivots via, for example, the pivot bolt 26 and the collar 29 that have been inserted in the boss 18.

A dot-and-dash line indicated by a reference sign 13 indicates a straight line that is the center on which the operating pedal 12 pivots (hereinafter referred to as the "pivot center line"). Moreover, the tipper end surface of the operating pedal 12 forms a curved shape that is equidistant from the pivot center line 13 of the operating pedal 12.

The vehicle operating pedal apparatus 10A is provided with an angle sensor 50. The angle sensor 50 detects the angle of rotation of the operating pedal 12 that pivots on the pivot center line 13, and includes an IC (Integrated Circuit) holder 52 and a magnet holder 54. An IC 56 is fixed to and exposed from the IC holder 52. A magnet 58 is fixed to and exposed from the magnet holder 54. The IC 56 is a magnetic field sensor that detects the magnetic field of the magnet 58. Examples of the IC 56 include a Hall IC.

As long as the IC 56 can detect the magnetic field of the magnet 58, it is not necessary for the IC 56 and the magnet 58 to be exposed. The same point is valid with regard to the following embodiments and modifications.

The IC holder 52 is substantially cuboid in shape. A snap-fit portion 60 and a screw hole 62 are provided to the left surface of the IC holder 52. A connector 64 is provided to the back surface of the IC holder 52. A cuboid block is formed, protruding, on the lower part of the right surface of the IC holder 52. The IC 56 is placed on the right side surface of the block.

The IC holder 52 is attached to the left support member 20 with the left surface of the IC holder 52 in contact with the inner surface (right surface) of the left support member 20. Hence, a first mounting hole 31 and a second mounting bole 32 are provided in the left support member 20 between the upper end of the left support member 20 and the left pivot hole 21. The protruding snap-fit portion 60 is inserted from the right side of the first mounting hole 31, and locked into the first mounting hole 31. A mounting bolt 66 is passed through the second mounting hole 32 from the left side of the second mounting hole 32. Furthermore, the mounting bolt 66 is assembled into the screw hole 62. The IC holder 52 is attached to the inner surface (right surface) of the left support member 20 in this manner, which places the IC 56 between the left support member 20 and the right support member 22 (that is, on the inner side).

The magnet holder 54 includes a flat portion 55 and a curved portion 57. The curved portion 57 of the magnet holder 54 is curved with a radius of curvature substantially equal to that of the upper end surface of the operating pedal 12. The flat portion 55 of the magnet holder 54 extends downward from the left end of the curved portion 57 of the magnet holder 54. Furthermore, the magnet 58 that is laid in an arc shape with a radius substantially equal to the distance from the pivot center line 13 to the IC 56 is provided on the left surface of the flat portion 55 of the magnet holder 54. The magnet holder 54 is attached to the upper end surface of the operating pedal 12. In order to attach the magnet holder 54, the magnet holder 54 is provided with a snap-fit portion 68. The snap-fit portion 68 has a protruding shape, and is inserted and locked into the upper end of the operating pedal 12. The magnet holder 54 is attached to the upper end of the operating pedal 12 in this manner. As a result, the curved portion 57 of the magnet holder 54 covers the upper end surface of the operating pedal 12, and the flat portion 55 of the magnet holder 54 covers an area above the boss 18 on the left surface of the operating pedal 12. Furthermore, the center of the arc of the magnet 58 provided on the left surface of the flat portion 55 of the magnet holder 54 is located on the pivot center line 13. Consequently, the magnet 58 of the magnet holder 54 faces the IC 56 of the IC holder 52 in the left-right direction in the area above the boss 18 on the left surface of the operating pedal 12.

In other words, the IC 56 and the magnet 58 face each other in a position that is closer to the boss 18 (that is, to the pivot bolt 26 and the collar 29) than the upper end surface of the operating pedal 12.

The magnet holder 54 is provided with a cover 70. The cover 70 juts out toward the right surface of the IC holder 52 from the upper and back edges of the flat portion 55 of the magnet holder 54 that has a fan shape in side view. Consequently, the cover 70 is disposed in an outer space that touches a gap across which the IC 56 and the magnet 58 face each other, along the upper and back edges of the flat portion 55 of the magnet holder 54 that has a fan shape in side view, and obscures the gap across which the IC 56 and the magnet 58 face each other.

(2) Second Embodiment

As illustrated in FIGS. 6 to 10, a vehicle operating pedal apparatus 10B according to a second embodiment includes an operating pedal 12B. The operating pedal 12B is a hollow pedal formed by mating a pair of split halves together. A first latch hole 33 and a second latch hole 34 are formed in the pair of split halves that are apart from each other at the upper end of the operating pedal 12B.

The vehicle operating pedal apparatus 10B is provided with an angle sensor 50B. The angle sensor 50B includes an IC holder 52B and a magnet holder 54B. A cuboid block is formed, protruding, on the upper part of the right surface of an IC holder 52B. An IC 56B is fixed to and exposed from the right side surface of the block.

A snap-fit portion 68B is provided on the right surface of the magnet holder 54B. The snap-fit portion 68B has a protruding shape, and is inserted and locked into the second latch hole 34 of the operating pedal 121. On the other hand, a magnet 58B and a snap-fit portion 69B are provided on the left surface of the magnet holder 54B. The magnet 58B is laid on the left surface of the magnet holder 54B in an arc shape with a radius substantially equal to the distance from the pivot center line 13 to the IC 56, and fixed to and exposed from the left surface of the magnet holder 54B. The snap-fit portion 69B has a protruding shape, and is inserted and locked into the first latch hole 33 of the operating pedal 128. The magnet holder 54B is attached to the tipper end of the operating pedal 128 in this manner. As a result, a part of the upper end surface of the operating pedal 12D is formed on the upper surface of the magnet holder 54B. Furthermore, the center of the are of the magnet 58B provided on the left surface of the magnet holder 54B is located on the pivot center line 13.

Consequently, the IC 56B and the magnet 58B face each other in the left-and-right direction in a position that is closer to die boss 18 (that is, to the pivot bolt 26 and the collar 29) than the upper end surface of the operating pedal 12B.

The magnet holder 54B is provided with a cover 70B. The cover 70B juts out upward and backward of the IC bolder 52B from the upper and back edges of the left surface of the magnet holder 54B. Consequently, the cover 70B is disposed in an outer space that touches a gap across which the IC 56B and the magnet 58B face each other, along the upper and back edges of the left surface of the magnet holder 54B, and obscures the gap across which the IC 56B and the magnet 58B face each other.

(3) Third Embodiment

As illustrated in FIGS. 11 to 15, a vehicle operating pedal apparatus 10C according to a third embodiment is provided with an angle sensor 50C. The angle sensor 50C includes an IC holder 52C and a magnet holder 54C. The IC holder 52C is substantially cuboid in shape. A snap-fit portion 60C is provided close to the screw hole 62 in the left surface of the IC holder 52C. Hence, a first mounting hole 31C into which the snap-lit portion 60C is inserted and locked is provided in the left support member 20, close to the second mounting hole 32 (refer to FIG. 2) and directly above the left pivot hole 21. An IC 56C is fixed to and exposed from the lower surface of the IC holder 52C. The IC holder 52C is attached to the left support member 20, which locates the IC 56C of the IC holder 52C in roughly the middle between the left support member 20 and the right support member 22 and above the operating pedal 12, and causes the IC 56C to face the middle of the upper end surface of the operating pedal 12 in the up-and-down direction.

The magnet bolder 54 includes a flat portion 55C and a curved portion 57C. The curved portion 57C of the magnet holder 54C is curved with a radius of curvature substantially equal to that of the upper end surface of the operating pedal 12. Furthermore, the magnet 58C is laid on and exposed from the upper surface of the curved portion 57C of the magnet holder 54C, on a center line passing through the middle in the left-and-right direction of the upper surface. The flat portion 55C of the magnet holder 54C extends downward from the left end of the curved portion 57C of the magnet holder 54C. The magnet holder 54C is attached to the upper end surface of the operating pedal 12. In order to attach the magnet holder 54C, the magnet holder 54C is provided with two snap-fit portions 68C and 69C. The snap-fit portion 68C has a protruding shape, and is inserted and locked into the left surface of the operating pedal 12. The snap-fit portion 69C has a groove shape, and is fitted to the upper end of the operating pedal 12. The magnet holder 54C is attached to the upper end of the operating pedal 12 in this manner. As a result, the curved portion 57C of the magnet holder 54C covers the upper end surface of the operating pedal 12, and the flat portion 55C of the magnet holder 54C covers an area above the boss 18 on the left surface of the operating pedal 12.

Consequently, the magnet 58C provided on the upper surface of the curved portion 57C of the magnet holder 54C is located, in an are shape that is equidistant from the pivot center line 13, on the upper end surface of the operating pedal 12, and faces the IC 56C in the up-and-down direction in roughly the middle between the left support member 20 and the right support member 22.

The magnet holder 54C is provided with a cover 70C. The cover 70C juts out further to the right than the IC holder 52C from the right end surface of the curved portion 57C of the magnet holder 54C. Consequently, the cover 70C is disposed in an outer space that touches a gap across which the IC 56C and the magnet 58C face each other, along the right end surface of the curved portion 57C of the magnet holder 54C, and obscures the right side of the gap across which the IC 56C and the magnet 58C face each other.

(4) Fourth Embodiment

As illustrated in FIGS. 16 to 20, a vehicle operating pedal apparatus 10D according to a fourth embodiment includes an operating pedal 12D. The operating pedal 12D is a hollow pedal formed by mating a pair of split halves together.

The vehicle operating pedal apparatus 10D according to the fourth embodiment is provided with an angle sensor 50D. The angle sensor 50D includes an IC holder 52D and a magnet holder 54D. The IC holder 52D forms a three-dimensional L shape in plan view. A snap-fit portion 60D is provided close to the screw hole 62 in the left surface of the ID holder 52D. Hence, a first mounting hole 31D into which the snap-fit portion 60D is inserted and locked is provided in the left support member 20, close to the second mounting hole 32 (refer to FIG. 2) and directly above the left pivot hole 21. An IC 56D is fixed to and exposed from the lower surface of the IC holder 52D. The IC holder 52D is attached to the left support member 20, which locates the IC 56D of the IC holder 52D in roughly the middle between the left support member 20 and the right support member 22 and above the operating pedal 12D, and causes the IC 56D to face the middle of the upper end surface of the operating pedal 12D in the up-and-down direction.

The magnet holder 54D includes a flat portion 55D and a curved portion 57D. The curved portion 57D of the magnet holder 54D is curved with a radius of curvature substantially equal to that of the upper end surface of the operating pedal 12. Furthermore, a magnet 58D is laid on and exposed from the upper end surface of the curved portion 57D of the magnet holder 54D, on a center line passing through the middle in the left-and-right direction of the upper surface. The flat portion 551 of the magnet holder 54D extends downward from the left end of the curved portion 57D of the magnet holder 54D. The magnet holder 54D is attached to the pair of split halves that are apart front each other at the upper end of the operating pedal 12D. In order to attach the magnet holder 54D, the magnet holder 54D is provided with snap-fit portions 68D and 69D. The snap-fit portion 68D, which is one of the snap-fit portions, has a protruding shape, is provided on the left surface of the flat portion 55D of the magnet holder 54D, and is inserted and locked into a latch hole 15 in the left surface (the left split half) of the operating pedal 12D. Iwo pairs of the snap-fit portion 68D and the latch hole 15 are provided. The other snap-fit portion 69D has a groove shape, provided in the lower surface of the curved portion 57D of the magnet holder 54D, and is fitted to the upper end of the right surface (the right split half) of the operating pedal 12D. The magnet holder 54D is attached to the upper end of the operating pedal 12D in this manner. As a result, a part of the upper end surface of the operating pedal 12D is formed by the upper surface of the magnet holder 54D.

Consequently, the magnet 58D provided on the upper surface of the curved portion 57D of the magnet holder 54D is located, in an arc shape that is equidistant from the pivot center line 13, on the upper end surface of the operating pedal 12D, and faces the IC 56D in the up-and-down direction in roughly the middle between the left support member 20 and the right support member 22.

The magnet holder 54D is provided with a cover 70D. The cover 70D juts out further to the right than the IC holder 52D along the right side of the magnet 58D on the upper surface of the curved portion 57D of the magnet holder 54D. Consequently, the cover 70D is disposed in an outer space that touches a gap across which the IC 56D and the magnet 58D face each other, along the right side of the IC bolder 52D, and obscures the right side of the gap across which the IC 56D and the magnet 58D face each other.

(5) Fifth Embodiment

As illustrated in FIGS. 21 to 25, a vehicle operating pedal apparatus 10E according to a fifth embodiment is provided with an angle sensor 50E. The angle sensor 50E includes the IC holder 52 and a magnet holder 54E. The magnet holder 54E forms a substantially annular shape including a circular opening 71.

On the left surface of the magnet holder 54E, a magnet 58E is laid in an arc shape formed by the center of the circular opening 71 and a radius substantially equal to the distance from the pivot center line 13 to the IC 56, and is fixed and exposed above the circular opening 71.

The magnet holder 54E is fitted on the boss 18 on the left side of the upper end of the operating pedal 12. In order to fit the magnet holder 54E, the above circular opening 71 is formed in the magnet holder 54E. The boss 18 is fitted into the circular opening 71. The magnet holder 54E is attached to the upper end of the operating pedal 12 in this manner. As a result, the magnet holder 54E covers around the boss 18 on the left surface of the operating pedal 12. Furthermore, the center of the circular opening 71 agrees with the center of the boss 18. Consequently, the center of the arc of the magnet 5E provided on the left surface of the magnet holder 54E is located on the pivot center line 13. Consequently, the magnet 58E of the magnet holder 54E faces the IC 56 of the IC holder 52 in the left-and-right direction above the boss 18 on the left side of the operating pedal 12.

In other words, the IC 56 and the magnet SXE face each other in a position that is closer to the boss 18 (that is, to the pivot bolt 26 and the collar 29) than the upper end surface of the operating pedal 12.

The left support member 20 is provided with a left hole 35 further to the front than the left pivot hole 21. Similarly, the right support member 22 is provided with a right hole 36 further to the front than the right pivot hole 23.

(6) Sixth Embodiment

As illustrated in FIGS. 26 to 30, a vehicle operating pedal apparatus 10F according to a sixth embodiment is provided with an angle sensor 50F. The angle sensor 50F includes an IC holder 52F and a magnet holder 54F. The IC holder 52F is a substantially cuboid in shape. An IC 56F is fixed to and exposed from the lower surface of the IC holder 52F. The IC holder 52F is attached to the left support member 20, which locates the IC 56F of the IC holder 52F in substantially the middle between the left support member 20 and the operating pedal 12 and above the boss 18 on the left side of the operating pedal 12, and causes the IC 56F to face in the up-and-down direction the middle in the left-and-right direction of the boss 18 on the left side of the operating pedal 12. The magnet holder 54F forms an annular shape. A distance from the center to the outer side surface of the annular ring of the magnet holder 54F that is, the radius of the magnet holder 54F) is slightly shorter than a distance from the pivot center line 13 to the IC 56F. Furthermore, a magnet 58F is laid on and exposed from the upper part of the outer side surface of the magnet holder 54F on a center line passing through the middle in the left-and-right direction of the magnet holder 54F. In other words, a distance from the center of the annular ring of the magnet holder 54F to the exposed surface of the magnet 58F is slightly shorter than the distance from the pivot center line 13 to the IC 56F. Moreover, the inside diameter of the magnet holder 54F is substantially equal to the outside diameter of the boss 18 on the left side of the operating pedal 12.

The annular magnet holder 54F is fitted onto the boss 18 on the left side of the operating pedal 12, on the left side of the upper end of the operating pedal 12. In order to fit the boss 18, the upper part of the side surface of the boss 18 on the left side of the operating pedal 12 is provided with a recessed snap-fit portion 17 along a center line passing through the middle in the left-and-right direction of the boss 18. On the other hand, the upper part of the inner side surface of the annular magnet holder 54F is provided with a protruding snap-fit portion 68F along the center line passing through the middle in the left-and-right direction of the magnet holder 54F. The snap-fit portion 68F of the boss 18 on the left side of the operating pedal 12 is fitted into the snap-fit portion 17 of the annular magnet holder 54F.

The magnet holder 54F is attached to the upper end of the operating pedal 12 in this manner, which locates the magnet 58F provided on the outer side surface of the annular magnet holder 54F, in an arc shape that is equidistant from the pivot center line 13, in a position that is closer to the boss 18 (that is, to the pivot bolt. 26 and the collar 29) than the upper end surface of the operating pedal 12, and causes the magnet 58F to face the IC 56F of the IC holder 52F in the up-and-down direction in roughly the middle between the left support member 20 and the operating pedal 12.

(7) Summary

As described in detail above, in the vehicle operating pedal apparatus 10 according to the embodiments, the IC 56 of the angle sensor 50 is provided between the left support member 20 and the right support member 22 (that is, on the inner side), and the magnet 58 of the angle sensor 50 is provided at the upper end of the operating pedal 12, facing the IC 56. Such a configuration allows the space for mounting the angle sensor 50 that detects the angle of rotation of the operating pedal 12 to be made compact in the vehicle operating pedal apparatus 10 according to the embodiments.

Moreover, in the vehicle operating pedal apparatus 10A according to the first embodiment, the IC 56 and the magnet 58 face each other in the position that is closer to the boss 18 (that is, to the pivot bolt 26 and the collar 29) than the upper end surface of the operating pedal 12. Consequently, the space for mounting the angle sensor 50 can be made more compact in the vehicle operating pedal apparatus 10A according to the first embodiment. The same point is valid with regard to the vehicle operating pedal apparatus 10B according to the second embodiment, the vehicle operating pedal apparatus 10E according to the fifth embodiment, and the vehicle operating pedal apparatus 10F according to the sixth embodiment.

Moreover, in the vehicle operating pedal apparatus 10C according to the third embodiment, the magnet 58C is provided, in the arc shape that is equidistant from the pivot center line 13 of the operating pedal 12, on the upper end surface of the operating pedal 12. Consequently, the detection accuracy of the IC 56 is improved in the vehicle operating pedal apparatus 10C according to the third embodiment. The same point is valid with regard to the vehicle operating pedal apparatus 10D according to the fourth embodiment.

The magnet 58 of the vehicle operating pedal apparatus 10A according to the first embodiment is provided, in the arc shape that is equidistant from the pivot center line 13 of the operating pedal 12, in the position that is closer to the boss 18 (that is, to the pivot bolt 26 and the collar 29) than the tipper end surface of the operating pedal 12. Hence, the detection accuracy of the IC 56 is improved also in the vehicle operating pedal apparatus 10A according to the first embodiment. The sane point is valid with regard to the vehicle operating pedal apparatus 10B according to the second embodiment, the vehicle operating pedal apparatus 10E according to the fifth embodiment, and the vehicle operating pedal apparatus 10F according to the sixth embodiment.

Moreover, in the vehicle operating pedal apparatus 10A according to the first embodiment, the cover 70 that juts out from the magnet holder 54, and is disposed in the outer space that touches the gap across which the IC 56 and the magnet 58 face each other obscures the gap. Consequently, the prevention of the entry of foreign matter into the detection space of the angle sensor 50 is encouraged. The same point is valid with regard to the vehicle operating pedal apparatus 10B according to the second embodiment, the vehicle operating pedal apparatus 10C according to the third embodiment, and the vehicle operating pedal apparatus 10D according to the fourth embodiment.

Moreover, in the vehicle operating pedal apparatus 10A according to the first embodiment, the cover 70 that juts out from the magnet holder 54 obscures, from the back side of the vehicle, the back side of the gap across which the IC 56 and the magnet 58 face each other, in addition to the upper side of the gap across which the IC 54 and the magnet 58 face each other. Consequently, the prevention of the entry of foreign matter into the detection space of the angle sensor 50 is encouraged. The same point is valid with regard to the vehicle operating pedal apparatus 10B according to the second embodiment.

Parenthetically, in the embodiments, the upper end surface of the operating pedal 12 is an example of a "side surface at one end of an operating pedal." The left pivot hole 21 and the right pivot hole 23 are examples of "holes provided in support members." The pivot bolt 26 and the collar 29 are examples of "pivot axis members." The left support member 20 and the right support member 22 are an example of a "pair of support members." The IC holder 52 is an example of a "device holder." The IC 56 is an example of a "Hall device."

(8) Others

The present invention is not limited to the above embodiments, and can be modified in various manners within a scope that does not depart from a gist thereof.

Figure 31:
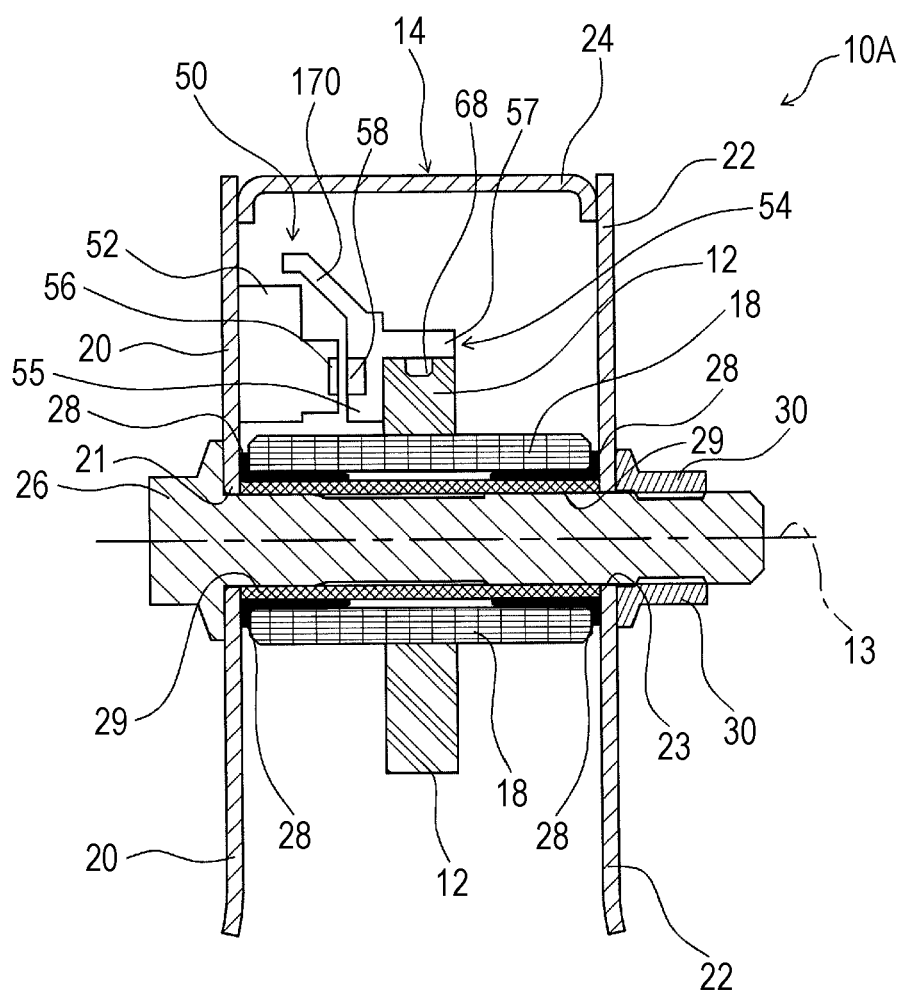
FIG. 31 is a diagram illustrating a first modification of the vehicle operating pedal apparatus according to the first embodiment in a cross-section taken along line I-I in FIG. 3.

For example, the cover 70 according to the first embodiment may be replaced with a cover 170 as illustrated in FIG. 31. In such a case, the cover 170 juts out upward and backward of the IC holder 52 from the tipper and back edges of the flat portion 55 of the magnet holder 54 that has a fan shape in side view. Consequently, the cover 170 is disposed in an outer space that touches the gap across which the IC 56 and the magnet 58 face each other, along the upper and back edges of the flat portion 55 of the magnet holder 54 that has a fan shape in side view, and obscures the gap across which the IC 56 and the magnet 58 face each other. Furthermore, the cover 170 inclines upward toward the magnet holder 54. In other words, the upper surface of the cover 170 that faces the outer space that touches the gap across which the IC 56 and the magnet 58 face each other inclines downward from the distal end toward the proximal end (near the flat portion 55 of the magnet holder 54).

Figure 32:
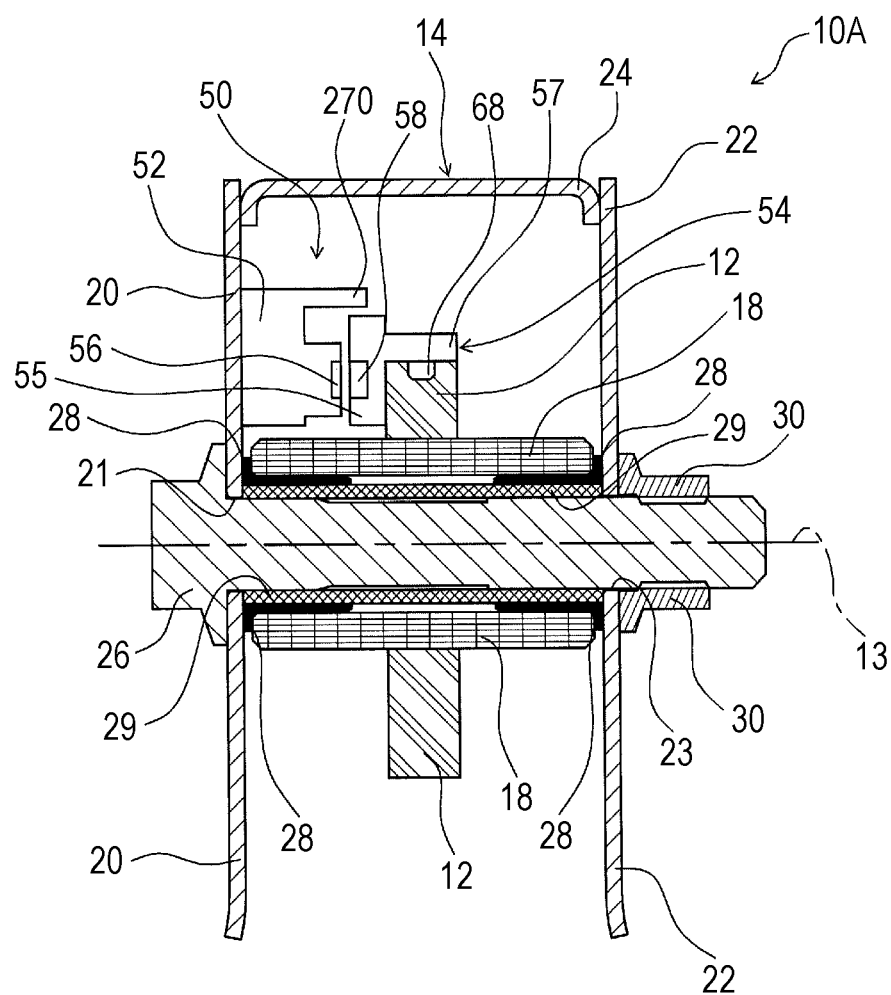
FIG. 32 is a diagram illustrating a second modification of the vehicle operating pedal apparatus in a cross-section taken along line I-I in FIG. 3.

Moreover, the cover 70 according to the first embodiment may be replaced with a cover 270 as illustrated in FIG. 32. In such a case, the cover 270 juts out upward and backward of the magnet holder 54 from the upper and back edges of the upper surface of the IC holder 52. Consequently, the cover 270 is disposed in an outer space that touches the gap across which the IC 56 and the magnet 58 face each other, along the upper and back edges of the flat portion 55 of the magnet holder 54 that has a fan shape in side view, and obscures the gap across which the IC 56 and the magnet 58 face each other.

Moreover, the cover 70 according to the first embodiment may be replaced with a cover 370 as illustrated in FIG. 33. In such a case, the cover 370 juts out upward and backward of the magnet holder 54 from the upper and back edges of the upper surface of the ID holder 52, and reaches further to the right than the magnet holder 54. Consequently, the cover 370 is disposed in an outer space that touches the gap across which the IC 56 and the magnet 58 face each other, along the upper and back edges of the flat portion 55 of the magnet holder 54 that has a fan shape in side view, and obscures the gap across which the IC 56 and the magnet 58 face each other. Furthermore, the distal end of the cover 370 inclines downward toward the edge (the right).

Figure 34:
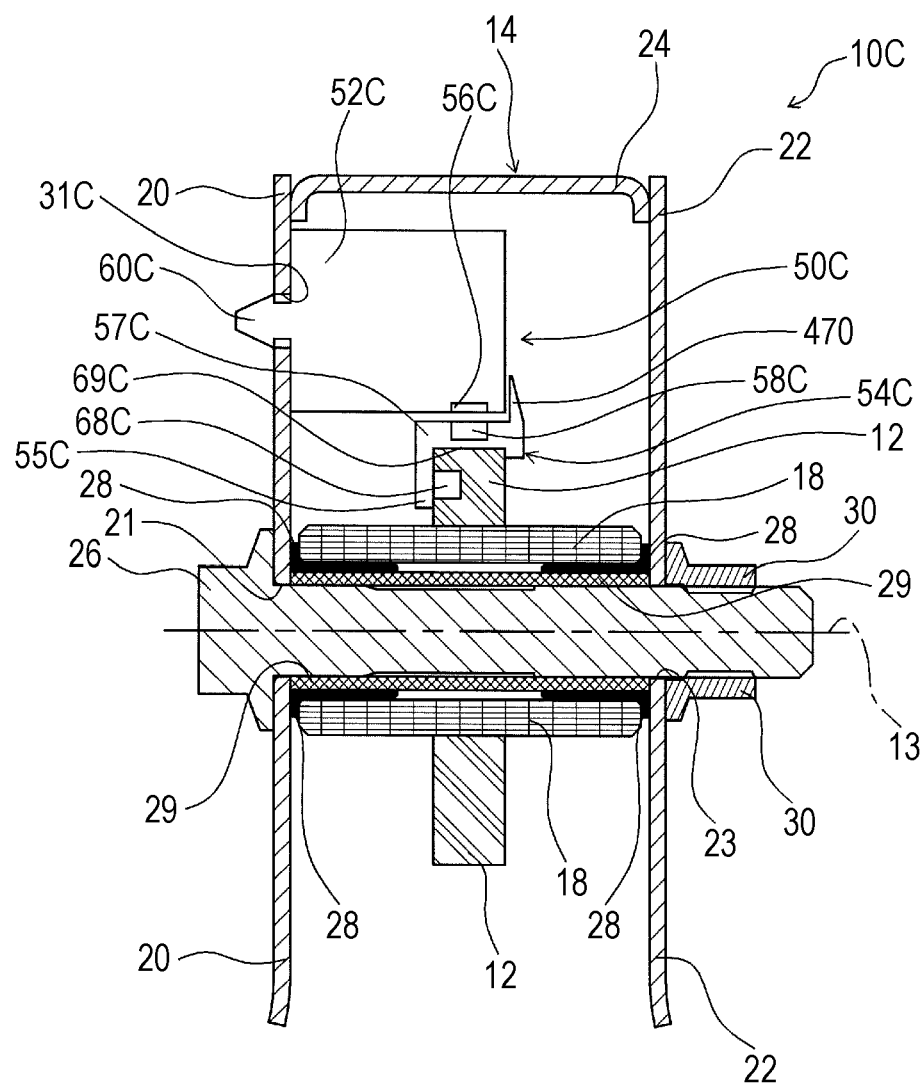
FIG. 34 is a diagram illustrating a modification of the vehicle operating pedal apparatus according to the third embodiment in a cross-section taken along line III-III in FIG. 13.

Moreover, the cover 70C according to the third embodiment may be replaced with a cover 470 as illustrated in FIG. 34. In such a case, the cover 470 juts out rightward of the IC holder 52C from the right end surface of the curved portion 57C of the magnet holder 54C as in the above cover 70C. Consequently, the cover 470 is disposed in an outer space that touches the gap across which the IC 56C and the magnet 58C face each other, along the right end surface of the curved portion 57C of the magnet holder 54C, and obscures the right side of the gap across which the IC 56, and the magnet 58C face each other. Furthermore, the cover 470 inclines downward front the distal end toward the proximal end (near the curved portion 57C of the magnet holder 54C).

Moreover, the cover 70 according to the first embodiment may be replaced with a cover 570 as illustrated in FIG. 35. In such a case, the cover 570 juts out toward the right sur face of the IC holder 52 from the front edge of the flat portion 55 of the magnet holder 54 that has a fan shape in side view, in addition to the upper and back edges of the flat portion 55 of the magnet holder 54 that has a fan shape in side view. Consequently, the cover 570 is disposed in an outer space that touches the gap across which the IC 56 and the magnet 58 face each other, along the upper, back, and front edges of the flat portion 55 of the magnet holder 54 that has a fan shape in side view, and obscures the gap across which the IC 56 and the magnet 58 face each other.

In the modifications illustrated in FIGS. 31 to 35, the covers 170, 270, 370, 470, and 570 also encourage the prevention of the entry of foreign matter into the detection space of the angle sensor 50 as in the cover 70 according to the first embodiment.

Moreover, in the modification illustrated in FIG. 35, the cover 570 obscures, from the front side of the vehicle, the front side of the gap across which the IC 56 and the magnet 58 face each other, in addition to the upper and back sides of the gap across which the IC 56 and the magnet 58 face each other. Consequently, the prevention of the entry of foreign matter into the detection space of the angle sensor 50 is encouraged.

Moreover, in the modification illustrated in FIG. 31, the upper surface of the cover 170 that faces the outer space of the gap across which the IC 56 and the magnet 58 face each other inclines downward from the distal end toward the proximal end (near the flat portion 55 of the magnet holder 54), which prevents the build-up of foreign matter. The same point is valid with regard to the cover 470 according, to the modification illustrated in FIG. 34.

Figure 36:
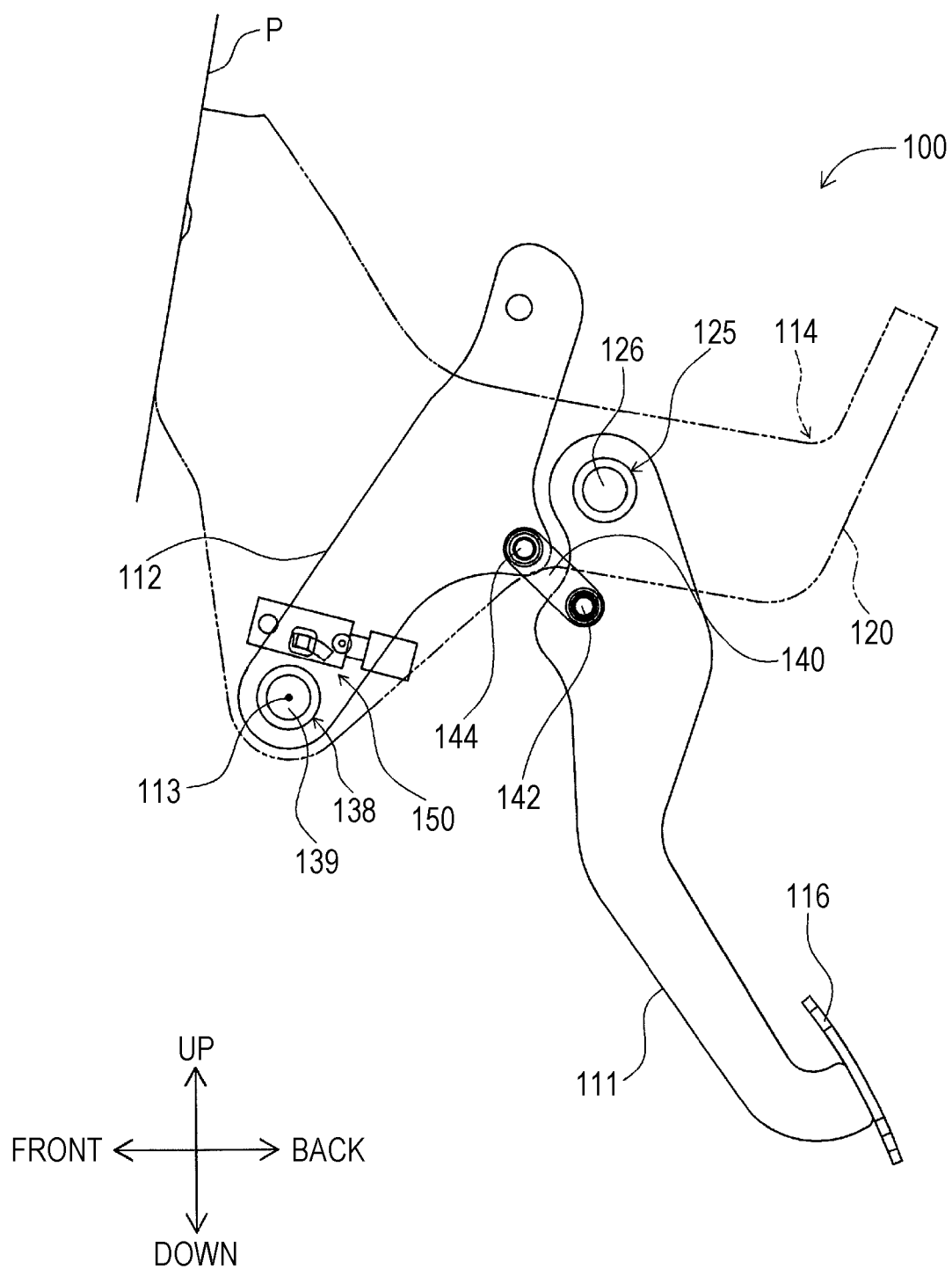
FIG. 36 is a side view illustrating a modification of the vehicle operating pedal apparatus.

Moreover, as illustrated in FIG. 36, the present invention may be carried out in a vehicle operating pedal apparatus 100 including what is called a link-type pedal mechanism. The vehicle operating pedal apparatus 100 includes a first operating pedal 111, a second operating pedal 112, and a pair of support members 114, and is mounted on a vehicle.

Figure 37:
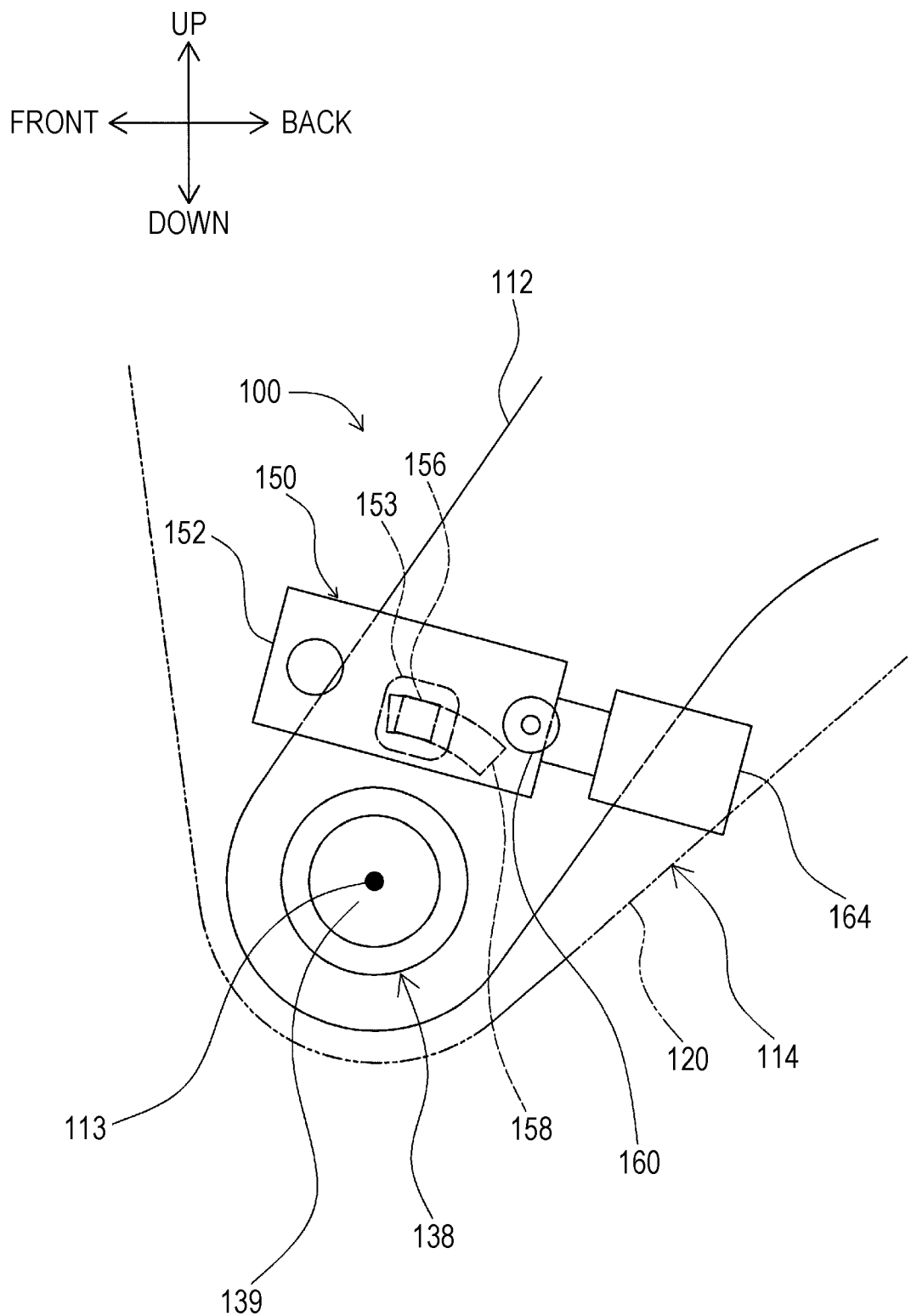
FIG. 37 is an enlarged side view illustrating a part of the modification.
Figure 38:
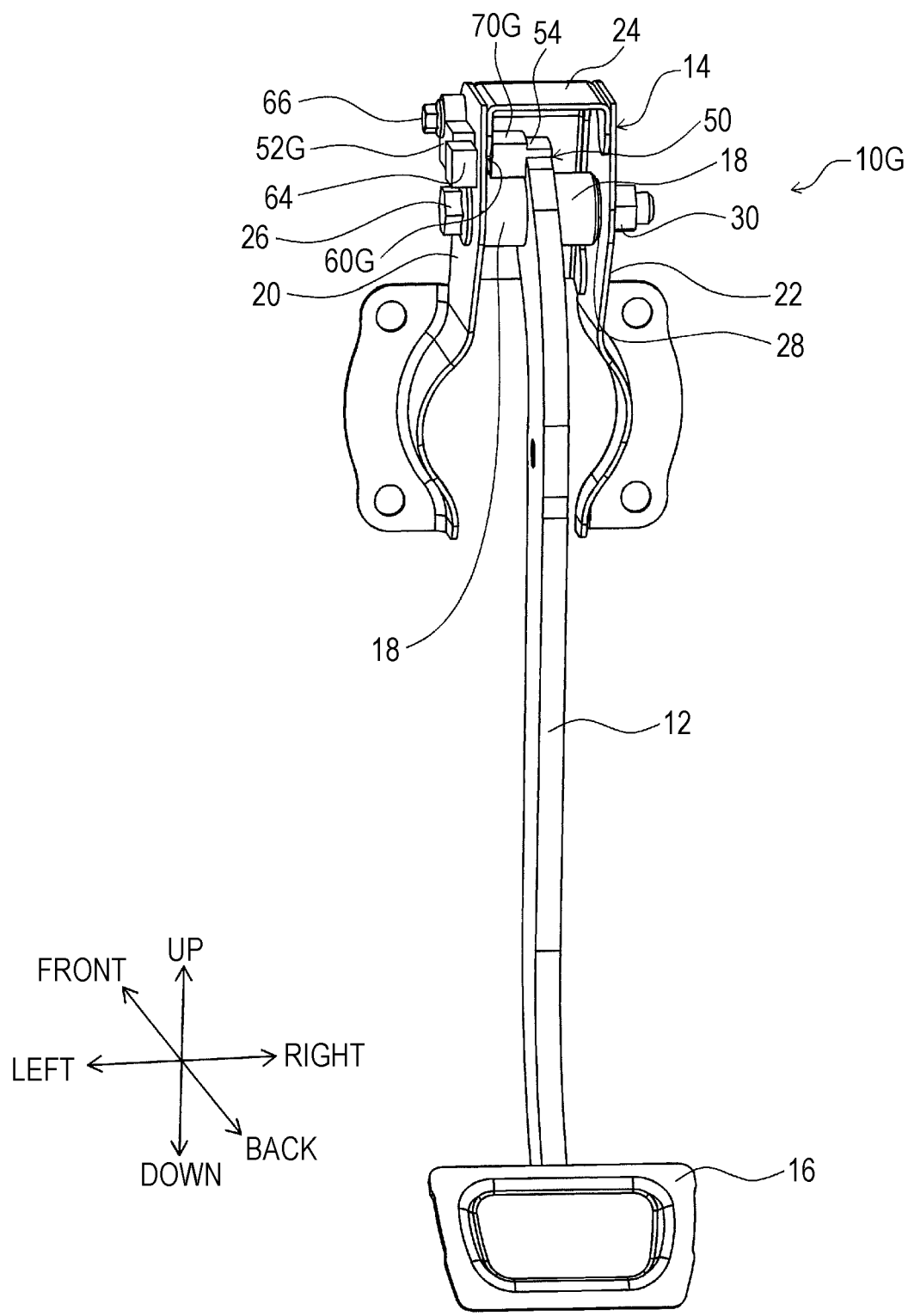
FIG. 38 is a perspective view illustrating a vehicle operating pedal apparatus according to a seventh embodiment.
Figure 39:
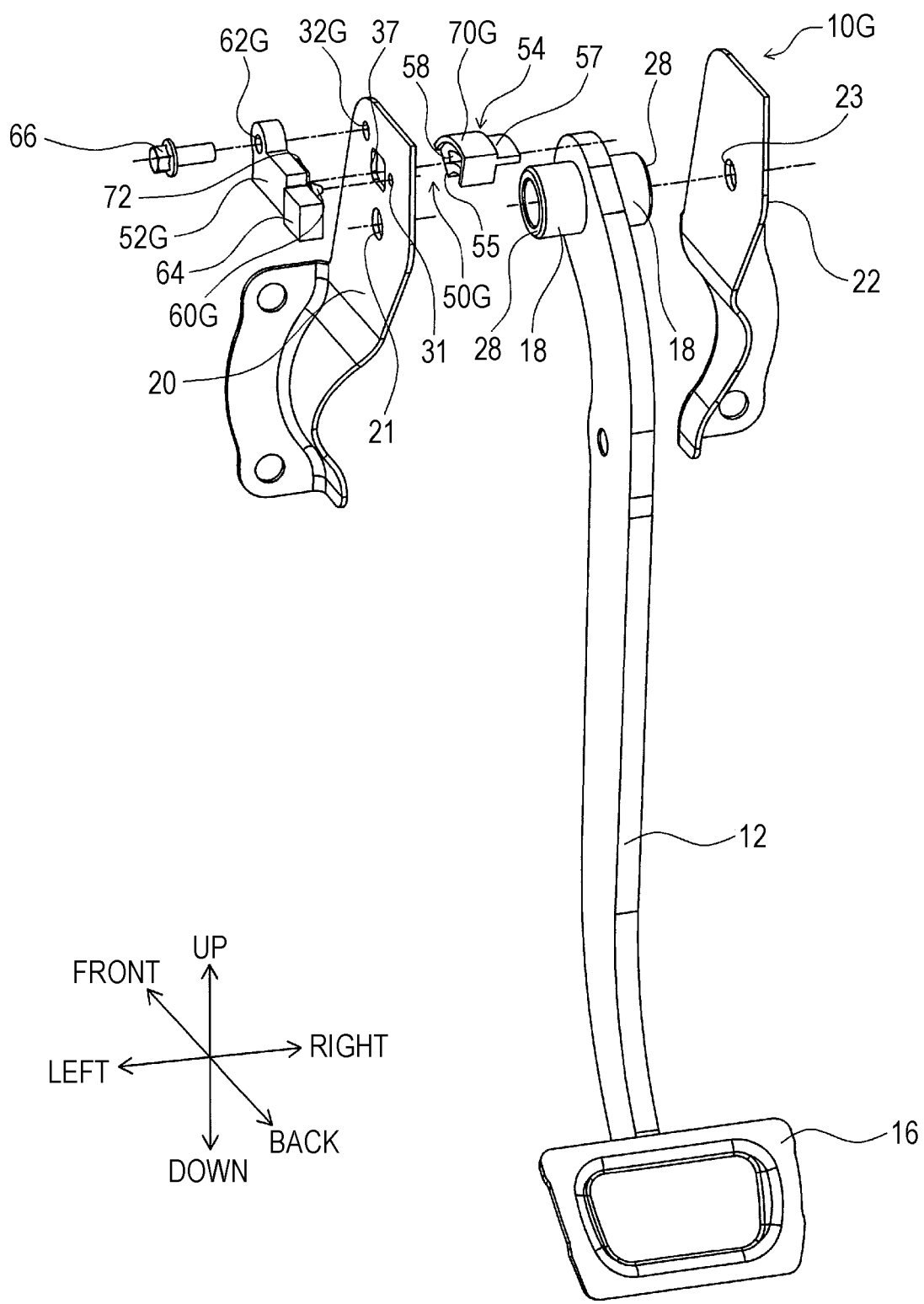
FIG. 39 is an exploded perspective view illustrating the vehicle operating pedal apparatus.

The pair of support members 114 faces each other, spaced a predetermined distance away from each other in the left-and-right direction, and is fixed to the dash panel P. In FIG. 36 and FIG. 37 described below, the support member on the left side (hereinafter referred to as the "left support member") 120 of the pair of support members 114 is indicated by a chain double-dashed line, and the support member on the right side is not illustrated.

A first shaft 125 is placed at the upper end of the first operating pedal 111. The first shaft 125 includes a pivot bolt 126, pivot holes provided in the pair of support members 114, and a tubular boss, collar, bushing, nut, and the like that are provided to the first operating pedal 111 as in the pivot support structure of the operating pedal 12 according to the first embodiment. Consequently, the first shaft 125 supports the first operating pedal 111 between the pair of support members 114 in such a manner that the first operating pedal 111 is pivotable. A tread 116 is provided at the lower end of the first operating pedal 111. Therefore, the tread 116 can pivot relative to the pair of support members 114.

A second shaft 138 is placed at the lower end of the second operating pedal 112. The second shaft 138 includes a pivot bolt 139, pivot holes provided in the pair of support members 114, and a tubular boss, collar, bushing, nut, and the like that are provided to the second operating pedal 112 as in the pivot support structure of the operating pedal 12 according to the first embodiment. Consequently, the second shaft 138 supports the second operating pedal 112 between the pair of support members 114 in such a manner that the second operating pedal 112 is pivotable. A point indicated by a reference sign 113 indicates a pivot center line that is the pivot of the rotation of the second operating pedal 112 in a length direction of the pivot center line (the left-and-right direction). The midpoint of the second operating pedal 112 is coupled to the first operating pedal 111 by a link member 140 between the upper end and the lower end of the first operating pedal 111.

The link member 140 includes a first link pin 142 and a second link pin 144. The first link pin 142 is placed in the back part of the link member 140, and couples the link member 140 and the first operating pedal 111. Hence, the first link pin 142 supports the link member 140 in such a manner that the link member 140 is pivotable relative to the first operating pedal 111. On the other hand, the second link pin 144 is placed in the front part of the link member 140 and couples the link member 140 and the second operating pedal 112. Hence, the second link pin 144 supports the link member 140 in such a manner that the link member 140 is pivotable relative to the second operating pedal 112.

Therefore, in the vehicle operating pedal apparatus 100, when the tread 116 at the lower end of the first operating pedal 111 is stepped forward, the first operating pedal 111 pivots on the first shaft 125. Such pivotal rotation of the first operating pedal 111 is transmitted to the second operating pedal 112 via the link member 140. Consequently, the second operating pedal 112 pivots on the second shaft 138.

The vehicle operating pedal apparatus 100 is provided with an angle sensor 150. The angle sensor 150 detects the angle of rotation of the second operating pedal 112 that pivots on the pivot center line 113. As illustrated in FIG. 37, the angle sensor 150 includes an IC holder 152 and a magnet 158. An IC 156 for detecting the magnetic field of a magnet 158 is fixed to and exposed from the IC holder 152.

The IC holder 152 is substantially cuboid in shape. The left surface of the IC holder 152 is provided with, for example, a protruding snap-fit portion 160. The back surface of the IC holder 152 is provided with a connector 164. A cuboid block 153 is formed, protruding, on the lower part of the right surface of the IC holder 152. The IC 156 is placed on the right side surface of the block.

The IC holder 152 is attached to the left support member 120 with the left surface of the IC holder 152 in contact with the inner surface (right surface) of the left support member 120. Hence, the snap-fit portion 160 is inserted from the right side of a mounting hole provided in the left support member 120, and locked into the mounting hole. The IC holder 152 is attached to the inner surface (right surface) of the left support member 120 in this manner, which places the IC 156 of the IC holder 152 between the pair of support members 114 (that is, on the inner side).

The magnet 158 is fixed to and exposed from the left surface of the lower end of the second operating pedal 112 above the second shaft 138 (that is, the boss of the second operating pedal 112). The magnet 158 is placed in an arc shape with a radius substantially equal to a distance from the pivot center line 113 to the IC 156. Furthermore, the center of the arc of the magnet 158 is located on the pivot center line 113. Consequently, the magnet 158 faces the IC 156 of the IC holder 152 in the left-and-right direction in an area above the second shaft 138 on the left surface of the lower end of the second operating pedal 112. In other words, the IC 156 and the magnet 158 face each other in a position that is closer to the pivot bolt 139 of the second shaft 138 than the lower end surface of the second operating pedal 112.

In the above description, in the vehicle operating pedal apparatus 100, the IC 156 of the angle sensor 150 is provided between the pair of support members 114 (that is, on the inner side) and the magnet 158 of the angle sensor 150 is provided at the lower end of the second operating pedal 112, facing the IC 156. Such a configuration allows the space for mounting the angle sensor 150 that detects the angle of rotation of the second operating pedal 112 to be made compact in the vehicle operating pedal apparatus 100.

Moreover, in the vehicle operating pedal apparatus 100, the IC 156 and the magnet 158 face each other in the position that is closer to the pivot bolt 139 of the second shaft 138 than the lower end surface of the second operating pedal 112. Consequently, the space for mounting the angle sensor 150 can be made more compact in the vehicle operating pedal apparatus 100.

Parenthetically, in such a modification, the second operating pedal 112 is an example of an "operating pedal." The lower end surface of the second operating pedal 112 is an example of a "side surface at one end of an operating pedal." The pivot hole provided in the support member 114 is an example of a "hole provided in a support member." The pivot bolt 139 of the second shaft 138 is an example of a "pivot axis member." The IC 156 is an example of a "Hall device."

Figure 40:
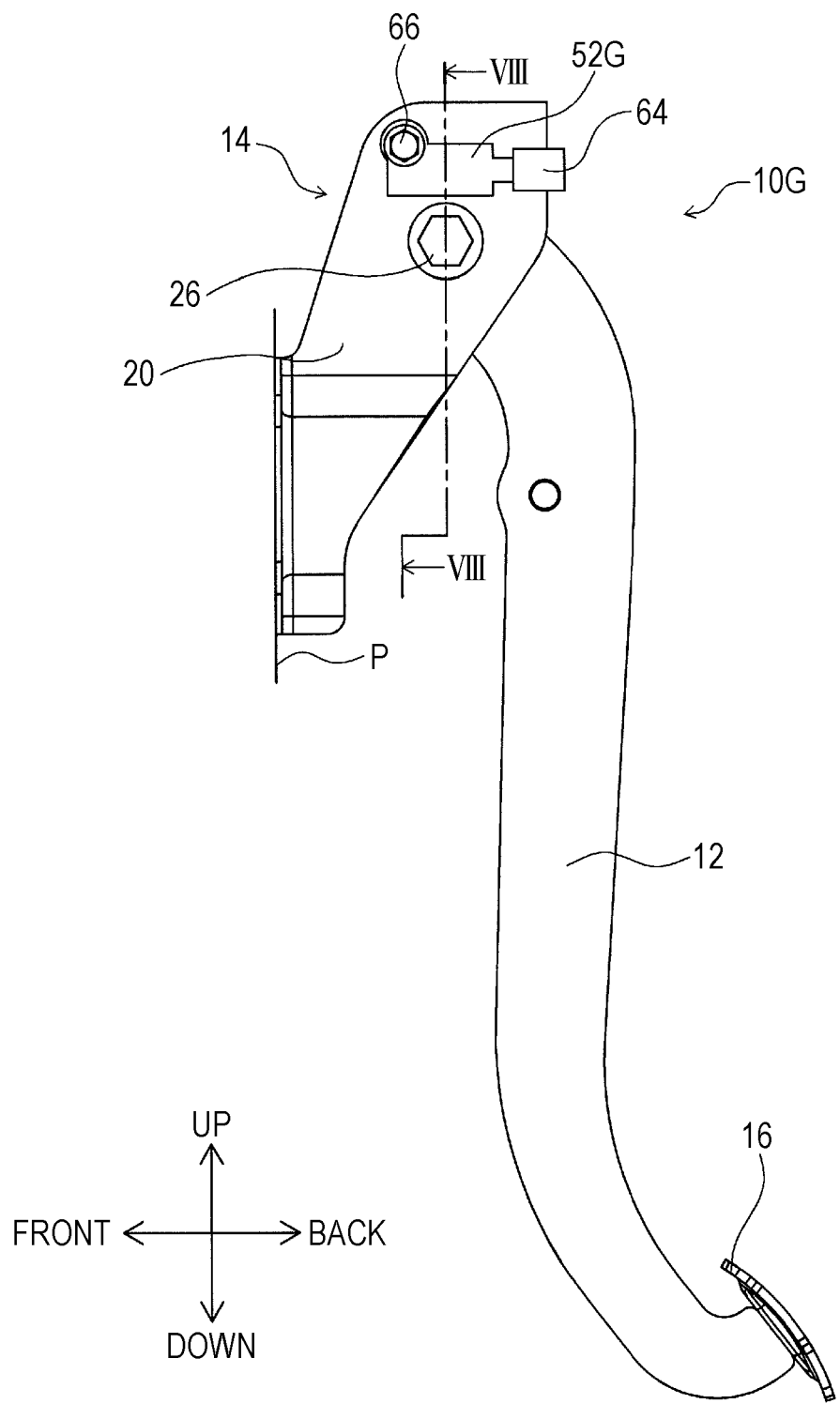
FIG. 40 is a side view illustrating the vehicle operating pedal apparatus.
Figure 41:
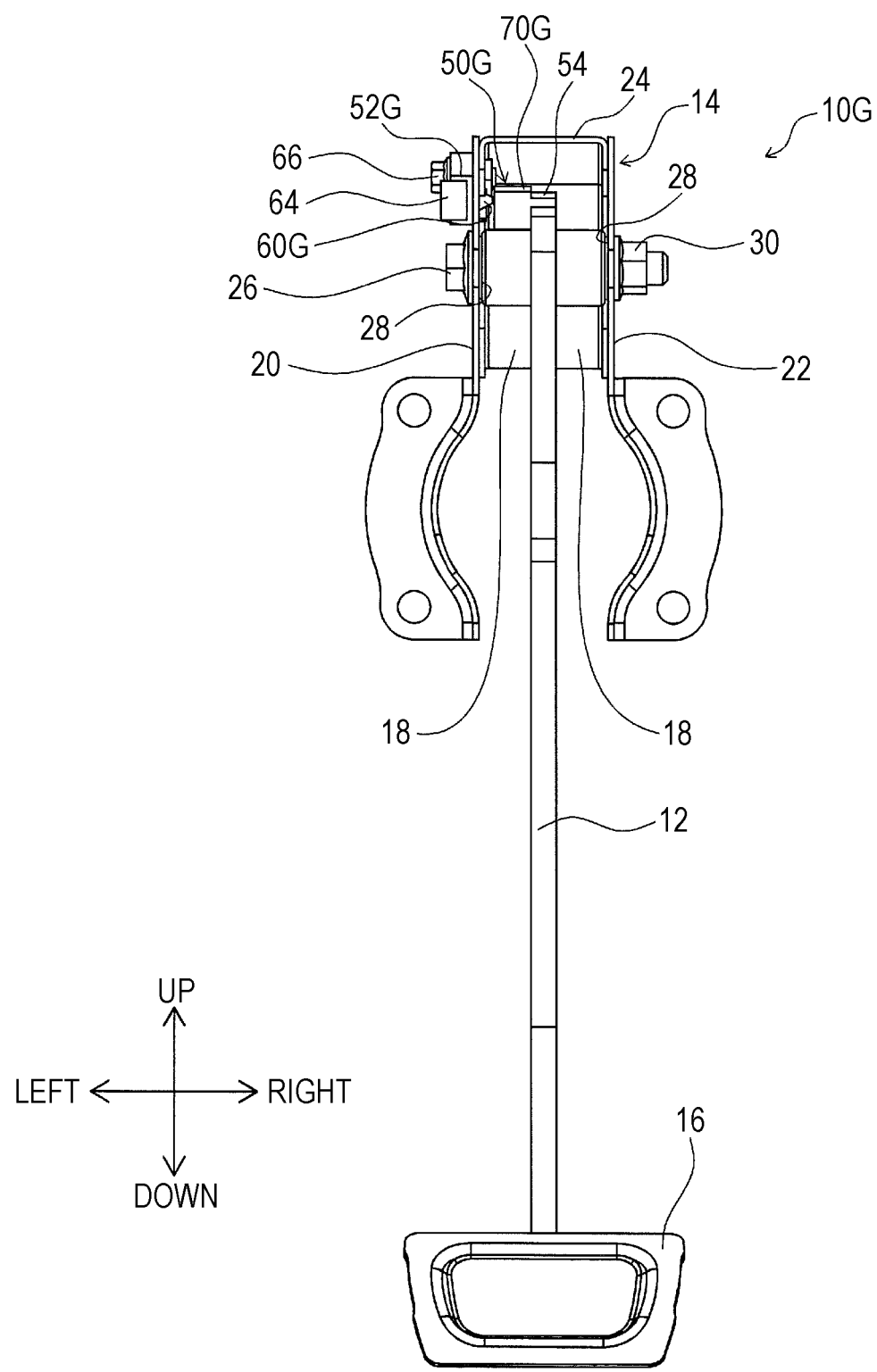
FIG. 41 is a front view illustrating the vehicle operating pedal apparatus.
Figure 42:
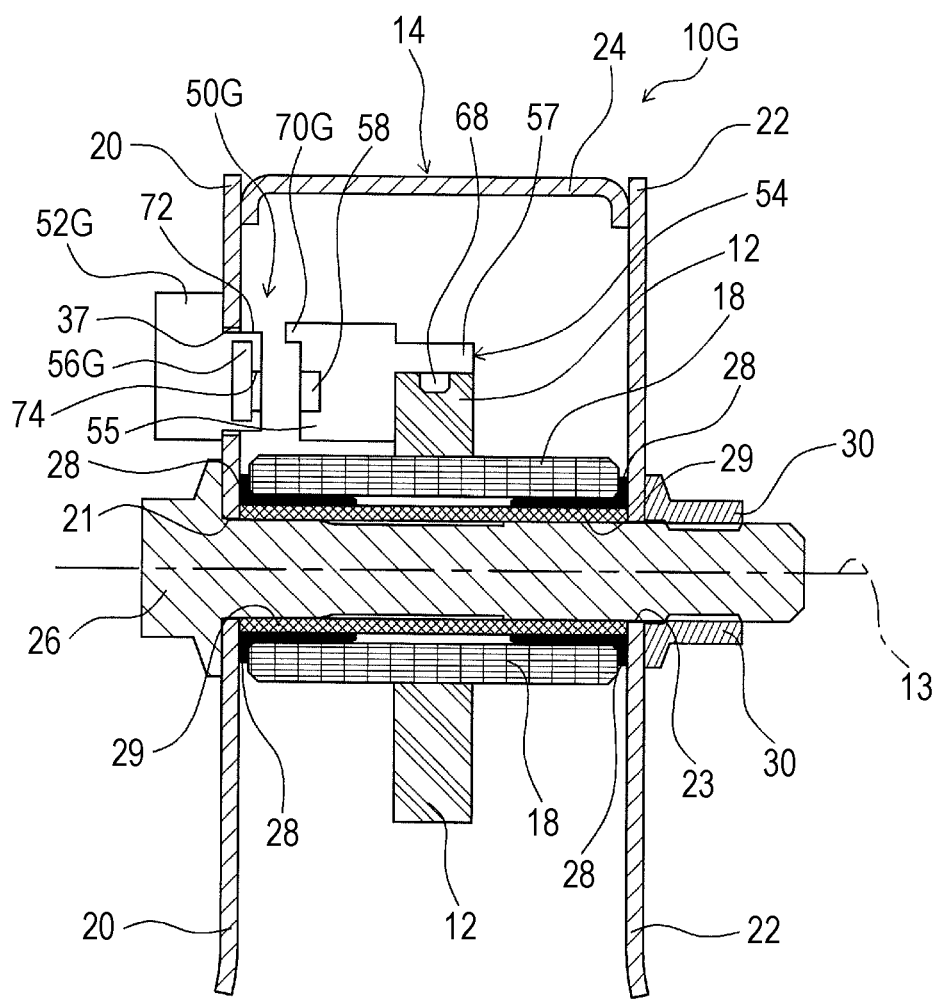
FIG. 42 is a diagram illustrating the vehicle operating pedal apparatus in a cross-section taken along line VIII-VIII in FIG. 40.

Moreover, a seventh embodiment is described below with reference to FIGS. 38 to 42. An alphabet letter "G" added to reference signs indicates the seventh embodiment in FIGS. 38 to 42. The directions in the drawings are as described in the drawings. However, in the side view of FIG. 40, the direction into the page is rightward, and the direction out of the page is leftward. In other words, the direction orthogonal to the page in FIG. 40 is the left-and-right direction. Moreover, in the front view of FIG. 41, the direction into the page is forward, and the direction out of the page is backward. In other words, the direction orthogonal to the page in FIG. 41 is the front-and-back direction. The same points are valid with regard to the cross-sectional view of FIG. 42.

As illustrated in FIGS. 38 to 42, a vehicle operating pedal apparatus 100 according to the seventh embodiment is provided with an angle sensor 50G. The angle sensor 50G includes an IC holder 52G and the magnet holder 54.

The IC holder 52B is substantially cuboid in shape, and the back surface of the IC holder 52G is provided with the connector 64. A snap-fit portion 60G is provided close to the connector 64 on the right surface of the IC holder 52G. A screw hole 62G is provided to a place at a corner where the front and upper surfaces of the IC holder 52G intersect, a place projecting in such a manner as to extend off the corner, and penetrates the place along the left-and-right direction.

Hence, in the left support member 20, a second mounting hole 32G into which the mounting bolt 66 protruding from the screw hole 62G is screwed is provided in the middle between the front part and the upper part relative to the first mounting hole 31 into which the snap-fit portion 60G is inserted and locked.

Therefore, a female thread is formed in each of the screw hole 62G of the IC holder 52G and the second mounting hole 32G of the left support member 20. However, a female thread may not be formed in the screw hole 62G of the IC holder 52G.

A cuboid protrusion 72 is provided between the snap-fit portion 60G and the screw hole 62G on the right surface of the IC holder 52G. The protrusion 72 protrudes to the right from the right surface of the IC holder 52G. An IC 56G is fixed inside the protrusion 72. A part of the IC 56G is exposed in a window 74 provided in the right side surface of the protrusion 72.

The IC holder 52G is attached to the left support member 20 with the right surface (excluding the protrusion 72) of the IC holder 52G in contact with the outer surface (left surface) of the left support member 20. Hence, the left support member 20 is provided with an insertion hole 37 between the first mounting hole 31 and the second mounting hole 32G. The protrusion 72 of the IC holder 52G is inserted into the insertion hole 37 from the left side of the insertion hole 37. Consequently, the protrusion 72 of the IC holder 52G protrudes to the right from the right, side of the insertion hole 37 through the insertion hole 37. The snap-fit portion 60G of the IC holder 52G is inserted and locked into the first mounting hole 31 from the left side of the first mounting hole 31. Moreover, the mounting bolt 66 is screwed into the screw hole 62G of the IC holder 52G from the left side of the screw hole 62G. Consequently, the mounting bolt 66 protrudes to the right from the right side of the screw hole 62G through the screw hole 62G of the IC holder 52G. The protruding portion of the mounting bolt 66 is screwed into the second mounting hole 320 of the left support member 20 from the left side of the second mounting hole 32G.

The magnet holder 54 is similar to that of the first embodiment, excluding a cover 70G. The cover 70G does not obscure a gap across which the IC 56G and the magnet 58 face each other, unlike the first embodiment.

The IC holder 52G is attached to the outer surface (left surface) of the left support member 20 in this manner, which places a part (that is, the right half) of the IC 56G of the IC holder 52G between the left support member 20 and the right support member 22 (that is, on the inner side) in a position further to the right than the insertion hole 37 of the left support member 20. On the other hand, the remaining portion (that is, the left half) of the IC 56G of the IC holder 52G is placed in the insertion hole 37 of the left support member 20. Consequently, the IC 56G of the IC holder 52G faces the magnet 58 of the magnet holder 54 in the left-and-right direction in an area above the boss 18 on the left surface of the operating pedal 12.

The entire IC 56G of the IC holder 52G may be placed between the left support member 20 and the right support member 22 (that is, on the inner side) with the protrusion 72 of the IC holder 52G in the insertion hole 37 of the left support member 20.

In the above description, in the vehicle operating pedal apparatus 10G according to the seventh embodiment, the IC 56G of the angle sensor 50G is provided between the left support member 20 and the right support member 22 (that is, on the inner side), and the magnet 58 of the angle sensor 50G is provide at the upper end of the operating pedal 12, facing the IC 56G. Such a configuration allows the space for mounting the angle sensor 50G that detects the angle of rotation of the operating pedal 12 to be made compact in the vehicle operating pedal apparatus 10G according to the seventh embodiment.

Moreover, in the vehicle operating pedal apparatus 10G according to the seventh embodiment, the IC 56G and the nag net 58 face each other in a position that is closer to the boss 18 (that is, to the pivot bolt 26 and the collar 29) than the upper end surface of the operating pedal 12. Consequently, the space for mounting the angle sensor 50G can be made more compact in the vehicle operating pedal apparatus 10G according to the seventh embodiment.

The magnet 58 of the vehicle operating pedal apparatus 10G according to the seventh embodiment is provided, in an are shape that is equidistant from the pivot center line 13 of the operating pedal 12, in the position that is closer to the boss 18 (that is, to the pivot bolt 26 and the collar 29) than the upper end surface of the operating pedal 12 as in the first embodiment. Hence, the detection accuracy of the IC 56G is improved also in the vehicle operating pedal apparatus 10G according to the seventh embodiment.

Parenthetically, in the seventh embodiment, the upper end surface of the operating pedal 12 is an example of a "side surface at one end of an operating pedal." The left pivot hole 21 and the right pivot hole 23 are examples of "holes provided in support members," The pivot bolt 26 and the collar 29 are examples of "pivot axis members." The left support member 20 and the right support member 22 are an example of a "pair of support members." The IC holder 52G is an example of a "device holder" The IC 56G is an example of a "Hall device."

LIST OF REFERENCE SIGNS

10 Vehicle operating pedal apparatus
12 Operating pedal
13 Pivot center line
18 Boss
20 Left support member
21 Left pivot hole
22 Right support member
23 Right pivot hole
26 Pivot bolt
29 Collar
37 Insertion hole
50 Angle sensor
52 IC holder
54 Magnet holder
56 IC
58 Magnet
70 Cover
72 Protrusion
100 Vehicle operating pedal apparatus
112 Second operating pedal
113 Pivot center line
114 Pair of support members
139 Pivot bolt
150 Angle sensor
152 IC holder
156 IC
158 Magnet
P Dash panel

The invention claimed is:

1. A vehicle operating pedal apparatus comprising:
a pair of support members fixed to a vehicle member, the pair of support members facing each other;
an operating pedal provided at one end with a tubular boss for the pedal, the operating pedal being supported between the pair of support members in such a manner as to be pivotable on a pivot axis member that is inserted into holes provided in the support members and the boss;
an angle sensor configured to detect the angle of rotation of the operating pedal, the angle sensor including:
a Hall device provided on an inner side between the pair of support members; and
a magnet provided at the one end of the operating pedal, facing the Hall device, the Hall device being configured to detect the magnetic field of the magnet;
a device holder to which the Hall device is fixed, the device holder being attached to the support member;
a magnet holder to which the magnet is fixed, the magnet holder being attached to the one end of the operating pedal; and
a cover jutting out from the device holder or the magnet holder, the cover being disposed in at least part of a gap across which the Hall device and the magnet face each other, and of an outer space.

2. The vehicle operating pedal apparatus according to claim 1, wherein the magnet is placed, in an arc shape that is equidistant from a pivot center line of the operating pedal, on a side surface at the one end of the operating pedal.

3. The vehicle operating pedal apparatus according to claim 1, wherein the Hall device and the magnet face each other in a position that is closer to the pivot axis member than a side surface at the one end of the operating pedal.

4. The vehicle operating pedal apparatus according to claim 3, wherein, the device holder includes a protrusion to which the Hall device is fixed, the device holder is attached to the support member from the outside of the support member, wherein the protrusion of the device holder is inserted from the outer side to the inner side of the support member through an insertion hole of the support member to provide the Hall device on the inner side between the pair of support members.

5. The vehicle operating pedal apparatus according to claim 1, wherein the cover is provided to the device holder.

6. The vehicle operating pedal apparatus according to claim 1, wherein the cover is provided to the magnet holder.

7. The vehicle operating pedal apparatus according to claim 1, wherein the cover is provided to at least one of the upper side of the gap, the front side of a vehicle, or the back side of the vehicle.

8. The vehicle operating pedal apparatus according to claim 1, wherein the cover has a surface facing the outer space, the surface inclining downward from a distal end toward a proximal end thereof.

9. The vehicle operating pedal apparatus according to claim 4, wherein
the device holder includes a protrusion to which the Hall device is fixed, the device holder is attached to the support member from the outside of the support member, wherein the protrusion of the device holder is inserted from the outer side to the inner side of the support member through an insertion hole of the support member to provide the Hall device on the inner side between the pair of support members.

* * * * *